US008033426B2

(12) United States Patent
Becker et al.

(10) Patent No.: US 8,033,426 B2
(45) Date of Patent: Oct. 11, 2011

(54) APPARATUS, METHOD AND SYSTEM FOR RECONFIGURING ITEMS

(75) Inventors: Steven M. Becker, Johnston, IA (US); Jason Cope, Ankeny, IA (US); James D. Dimond, Ames, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 175 days.

(21) Appl. No.: 12/491,524

(22) Filed: Jun. 25, 2009

(65) Prior Publication Data

US 2009/0320955 A1 Dec. 31, 2009

Related U.S. Application Data

(60) Provisional application No. 61/075,818, filed on Jun. 26, 2008.

(51) Int. Cl.
*B67D 1/00* (2006.01)
*B67D 7/14* (2010.01)

(52) U.S. Cl. ........................................................ 222/52

(58) Field of Classification Search .................... 222/52, 222/83; 220/507, 500; 141/1, 94, 100, 329; 47/58.1 R See application file for complete search history.

(56) References Cited

U.S. PATENT DOCUMENTS

| | | | |
|---|---|---|---|
| 7,502,113 | B2 | 3/2009 | Deppermann et al. |
| 7,591,101 | B2 | 9/2009 | Deppermann |
| 7,611,842 | B2 | 11/2009 | Deppermann et al. |
| 7,703,238 | B2 | 4/2010 | Deppermann et al. |
| 2006/0046244 | A1 | 3/2006 | Deppermann |
| 2006/0048248 | A1 | 3/2006 | Deppermann |
| 2007/0207485 | A1 | 9/2007 | Deppermann et al. |
| 2008/0000815 | A1 | 1/2008 | Deppermann |
| 2008/0317279 | A1 | 12/2008 | Deppermann et al. |
| 2009/0215060 | A1 | 8/2009 | Deppermann et al. |

*Primary Examiner* — Kent L Bell

(74) *Attorney, Agent, or Firm* — Alston & Bird LLP

(57) ABSTRACT

Apparatuses, methods, and systems for reconfiguring some or all content from one or more first containers into a second container are provided. In an example of the apparatus, the apparatus has a dispensing system having a dispenser to dispense content from one container into another, and a delivery system adapted to reconfigure the dispensed content from the one container into another container. In another example, a method includes dispensing selected contents from one container and reconfiguring the dispensed contents from the one container into another. In another example, the system includes a controller, a machine controlled by the controller, wherein the machine has a pair of container handlers, a content dispenser, and a content delivery system. The controller is adapted to control the machine using a selection criterion to operate the content dispenser to dispense selected content from one container to move with the delivery system into another container.

9 Claims, 16 Drawing Sheets

100 7A & B 102 116 132 120 118 128 108 106 126 26 236 202 48 104 7A & B 204 206 200 226 208 212 234 230 224 222 228 210 232 220 50 218 40 216 56 226 30 34 38

APPARATUS, METHOD AND SYSTEM FOR RECONFIGURING ITEMS

CROSS-REFERENCE TO RELATED APPLICATIONS

This application claims priority under 35 U.S.C. §119 of a provisional application Ser. No. 61/075,818 filed Jun. 26, 2008, which application is hereby incorporated by reference in its entirety.

FIELD OF THE INVENTION

The present invention relates to reconfiguring seed from one or more containers into another container in an efficient and high throughput manner.

BACKGROUND

There are a wide variety of applications where seed need to be stored, where the seed can be protected and preserved, and at some time later be easily, efficiently, accurately identified and/or possibly individually selected, retrieved or discharged from one or more containers for reconfiguration into another container based upon the presence or absence of at least one advantageous property associated with the seed.

One notable example of this can be found in research and development directed toward identifying and perpetuating advantageous seed properties. For instance, plant researchers often group seed, into specific groups. In the case of seed, seed portions (e.g., a portion, sample or chip from the seed) may be removed from the seed for testing, what remains are viable seed that may be stored collectively or individually to protect against degradation or harm and to maintain viability. The information learned from testing the seed portions may indicate if the remaining, viable portion of a particular seed has the desired advantageous properties as a result of a biological trait, a genetic trait, a phenotypic trait, a morphological trait, or pedigree. Furthermore, the information learned from testing the seed portion can be linked with the individual seed from which it originated (viable seed portion) using an indexing system to correlate the two seed parts. Thus, by comparing a seed selection criterion with the information known about the seed, the remaining viable seed portion may be accurately identified, recovered, dispensed from its container and reconfigured into another container for storage with other viable seed portions meeting the same or other seed selection criterion.

A need has therefore been identified in the art for a more efficient and high throughput apparatus, method and system for reconfiguring any seed, seed part or seed portion, whether viable or not, from one or more containers, having been identified with the desired qualities, advantageous properties or genetics, into another container to provide a single container with seed having the desired qualities, advantageous properties and/or genetics

BRIEF SUMMARY OF THE INVENTION

Apparatuses, methods and systems to reconfigure some or all seed from one or more containers into another container in an efficient and high throughput manner are provided.

The apparatus includes a container handling system, a seed dispensing system and a seed delivery system. The container handling system holds one or more containers. The seed dispensing system dispenses seed from the one or more containers and the seed delivery system reconfigures dispensed seed from the one or more containers into another container.

Methods include dispensing selected seed from one or more containers and reconfiguring the dispensed seed into another container based upon a seed selection criterion.

Systems for reconfiguring some or all seed from one or more containers into another container are also provided. The system may include a computer and a machine operated by the computer. The machine may have a pair of container handlers, a seed dispensing system, and a seed delivery system. The computer is adapted to control the machine using a seed selection criterion to operate the seed dispensing system to dispense selected seed from one or more containers to reconfigure with the seed delivery system into another container.

DETAILED DESCRIPTION

Figure 1:
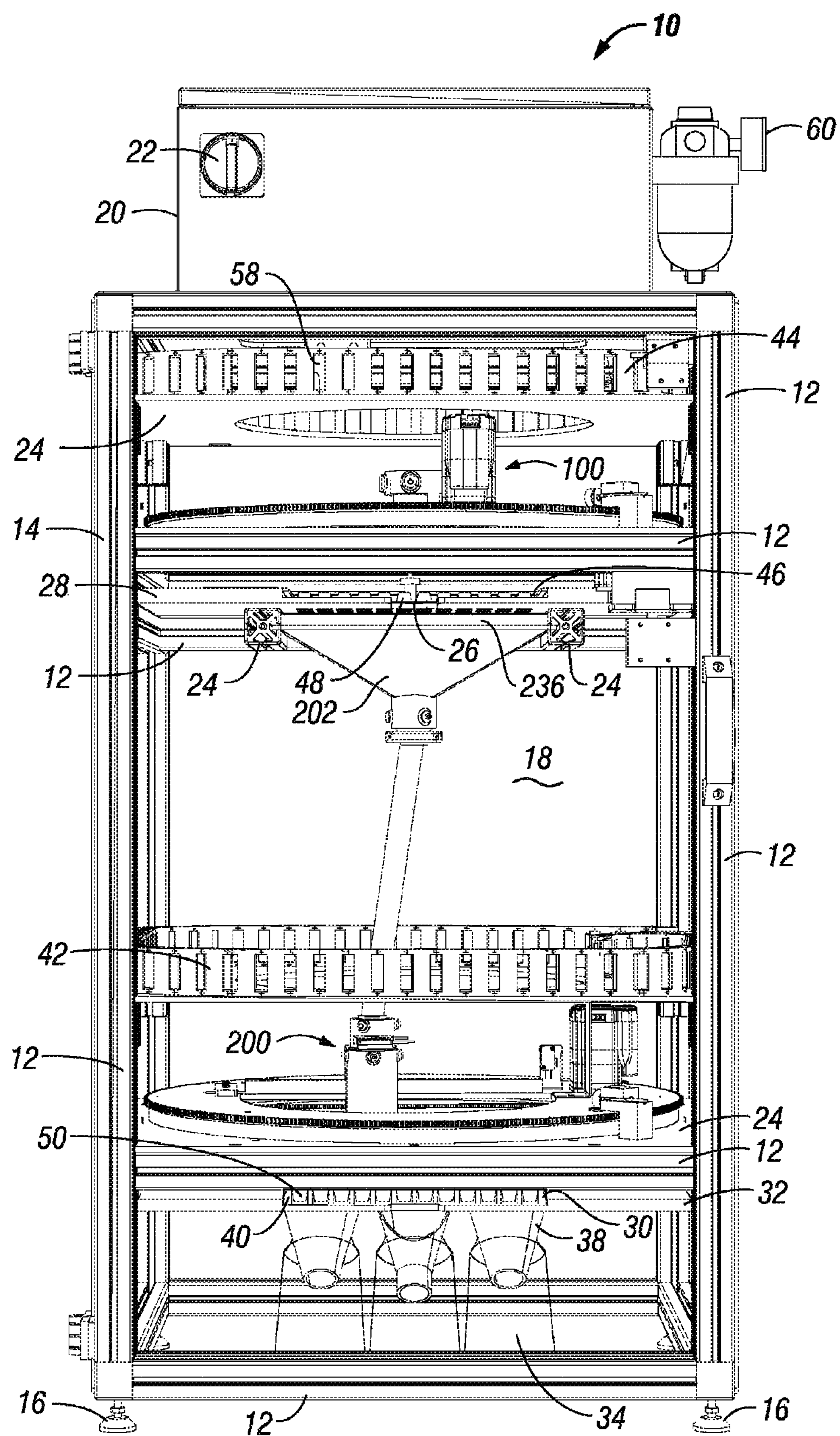
FIG. 1 is a front perspective view of the machine according to an exemplary embodiment of the present invention.

The following description is merely exemplary in nature and is not intended to limit the present disclosure, application or uses.

For a better understanding of the invention, several exemplary embodiments will now be described in detail. Reference will be taken from time-to-time to the appended drawings. Reference numerals will be used to indicate certain parts or locations in the drawings. The same reference numerals will indicate the same parts or locations throughout the drawings unless otherwise indicated.

Apparatus

In one aspect, the apparatuses of the present invention reconfigure some or all content or articles from one container into another container in an efficient and high throughput manner. Articles could include, but are not limited to, seed, seed parts, plant parts, parts, ingredients, compounds, medication, or the like. In another aspect, the apparatuses of the present invention reconfigure plant seed selected from one or more containers into another container to combine seed into one container wherein the selected seed have at least one property matching a seed selection criterion. Seed could include, but are not limited to seed from corn, canola, soybean, rice, or any other seed of interest. Typically, seed will be within size limits that are readily conducive to handling, such as the sizes exemplified by the seed listed above, however embodiments include modifications of any one or more of the various components of the container, dispensing, and delivery systems to facilitate handling of any seed or other items falling outside of the typical size ranges.

Figure 2:
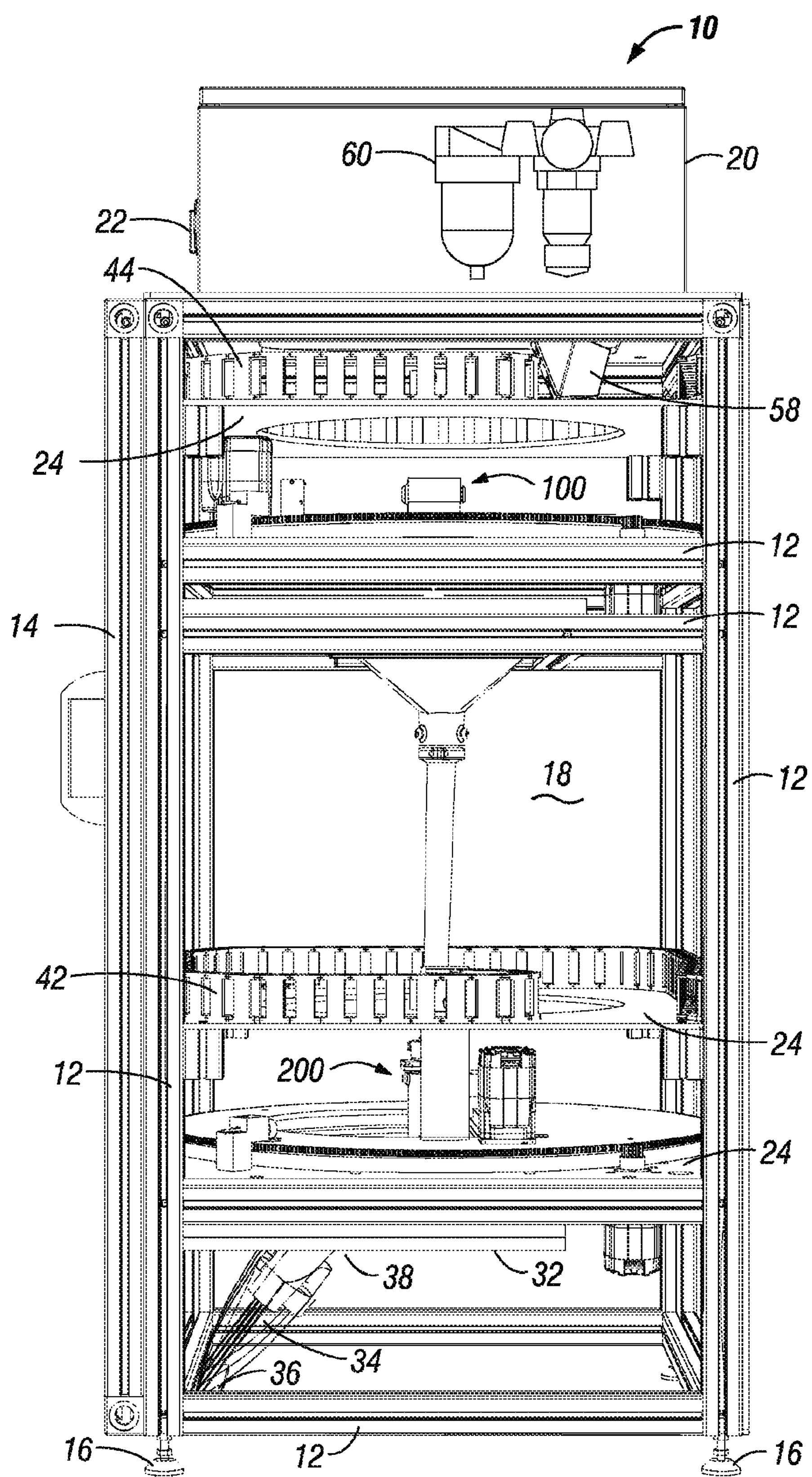
FIG. 2 is a side perspective view of the machine shown in FIG. 1.

FIGS. 1 and 2 show an exemplary embodiment of the seed reconfiguration machine 10 in front and side perspective views. Machine 10 operates within cabinet 12. In a preferred form, machine 10 has two primary operating systems, namely a dispensing system 100 and delivery system 200. The dispensing system 100 and delivery system 200 are supported and positioned relative to each other in cabinet 12 using mounting hardware 24. Like traditional machine cabinetry, cabinet 12 may be enclosed by panels 18, whether opaque or translucent, and include a door 14 for providing access to the interior. The base of cabinet 12 may include feet 16, whether adjustable or rigid, for supporting and controlling the orientation of cabinet 12 relative to a supporting surface. It should be appreciated that machine 10 need not operate within cabinet 12. Those skilled in the art can appreciate that machine 10 could operate within a confined or unconfined area providing for unrestricted access and a free-flow of containers into and out of machine 10. Cabinet 12 may be stationary or mobile. For example, cabinet 12 may include casters (not shown) in lieu of feet 16 for moving cabinet 12 about. Machine 10 may also include a control box 20 situated relative to the cabinet 12 to provide an enclosure for necessary hardware, software, wiring, electronics or the like for operation of the machine 10. Machine 10 may also include a hard control on/off switch 22, such as a dial, toggle or button for cutting and providing power to the machine 10. Wires from control box 20 are channeled through the cabinet 12 and enclosed in wire harness 42 connected to dispensing system 100 and wire harness 44 connected to delivery system 200. Within cabinet 12 and positioned relative to the dispensing system 100 is container holding hardware 28. Container holding hardware 28 is adapted to secure a container brought into cabinet 12, such as compartment layer 26. One skilled in the art should appreciate that container holding hardware 28 could be configured or adapted to hold various types and container shapes, including a bag, an envelope, a bubble tray, a reusable compartment tray, a breeder tray, a clamshell tray, seed tape, an assay tray, or any of the like. Container holding hardware could include a slot like slot 28 shown in FIG. 1. Slot 46 is configured to receive compartment layer 26 and provide a parking place for keeping compartment layer 26 in a fixed position relative to the container holding hardware 28. For example, one embodiment of the present invention includes the parking place for compartment layer 26 being keyed to secure the compartment layer 26 in a fixed position. The present invention contemplates that container holding hardware 28 could also be one or more brackets, one or more clamps, a sleeve, a recess, a conveyor, a carousel, a mechanical armature, a gantry, a conveyor in combination with a gantry, a multi-axis shuttle, a slot, or any like container holding structure, geometry, apparatus or device. In sum, these features would provide a holding means for securing compartment layer 26 at a fixed position relative to slot 46.

Container holding hardware 32 is provided within cabinet 12 for securing one or more containers introduced into cabinet 12, such as compartment layer 30 at a fixed position. Container holding hardware 32 is configured to hold compartment layer 30 in a fixed position and possibly in combination with an optional jig 40. Jig 40 may also be provided as a supportive layer configured to hold and provide some rigidity to compartment layer 30 to aid in handling and securing both within cabinet 12. For example, jig 40 may include handle 56 to aid in handling, moving and positioning jig 40 in container holding hardware 32. Jig 40 may also include one or more passive position indicators to indicate when jig 40 is properly positioned within container holding hardware 32. For example, jig 40 may include one or more small apertures (not shown) that cooperate and mate with posts (not shown) associated with container holding hardware 32 to indicate when jig 40 is correctly docked or positioned within container holding hardware 32. Delivery system 200 is adapted to reconfigure articles individually into another container, such as compartment layer 30 or reconfigure articles collectively into another container, such as envelope 34. In the case where the container is envelope 34, envelope 34 may be supported on one end within cabinet 12 by an envelope holder 36, as best illustrated in FIG. 2, and on the opposite end by feeder tube 38. Thus, multiple containers such as envelopes 34 or compartment layer 26 or 30 can be positioned and supported within or relative to cabinet 12. In one aspect of the present invention, a scanner 58 may be positioned within cabinet 12 relative to container holding hardware 28 such that scans from the scanner read the surface of the compartment layer 26 having an identifier, such as a UPC or other readable tag, to read the identifier and access information about the compartment layer 26 and/or each seed 52 within compartment layer 26. Those skilled in the art can appreciate that a scanner or reader similar to scanner 58 could also be positioned relative to container holding hardware 32.

Figure 3A:
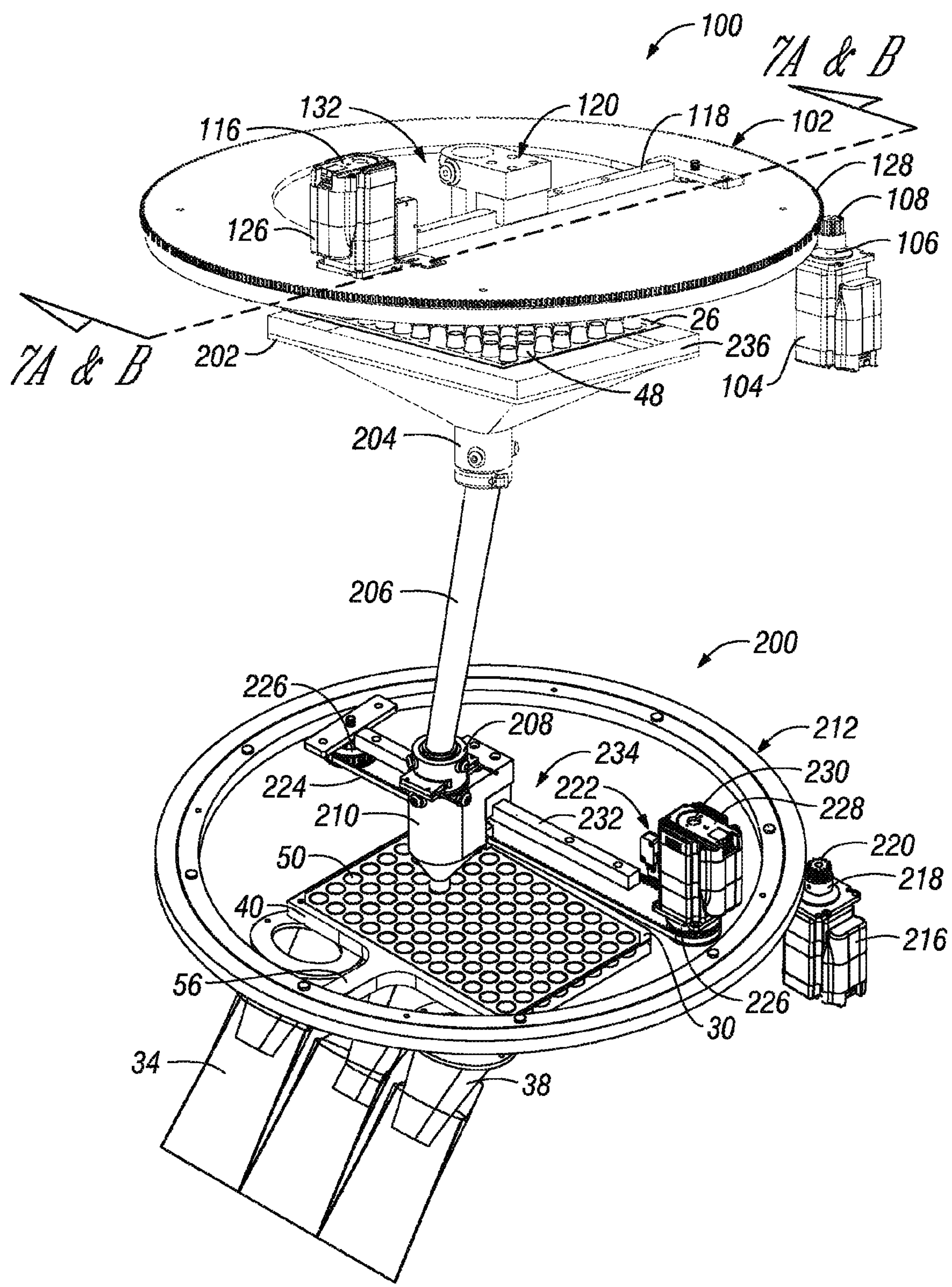
FIG. 3A is a perspective view of the machine without supporting hardware and cabinetry.
Figure 3B:
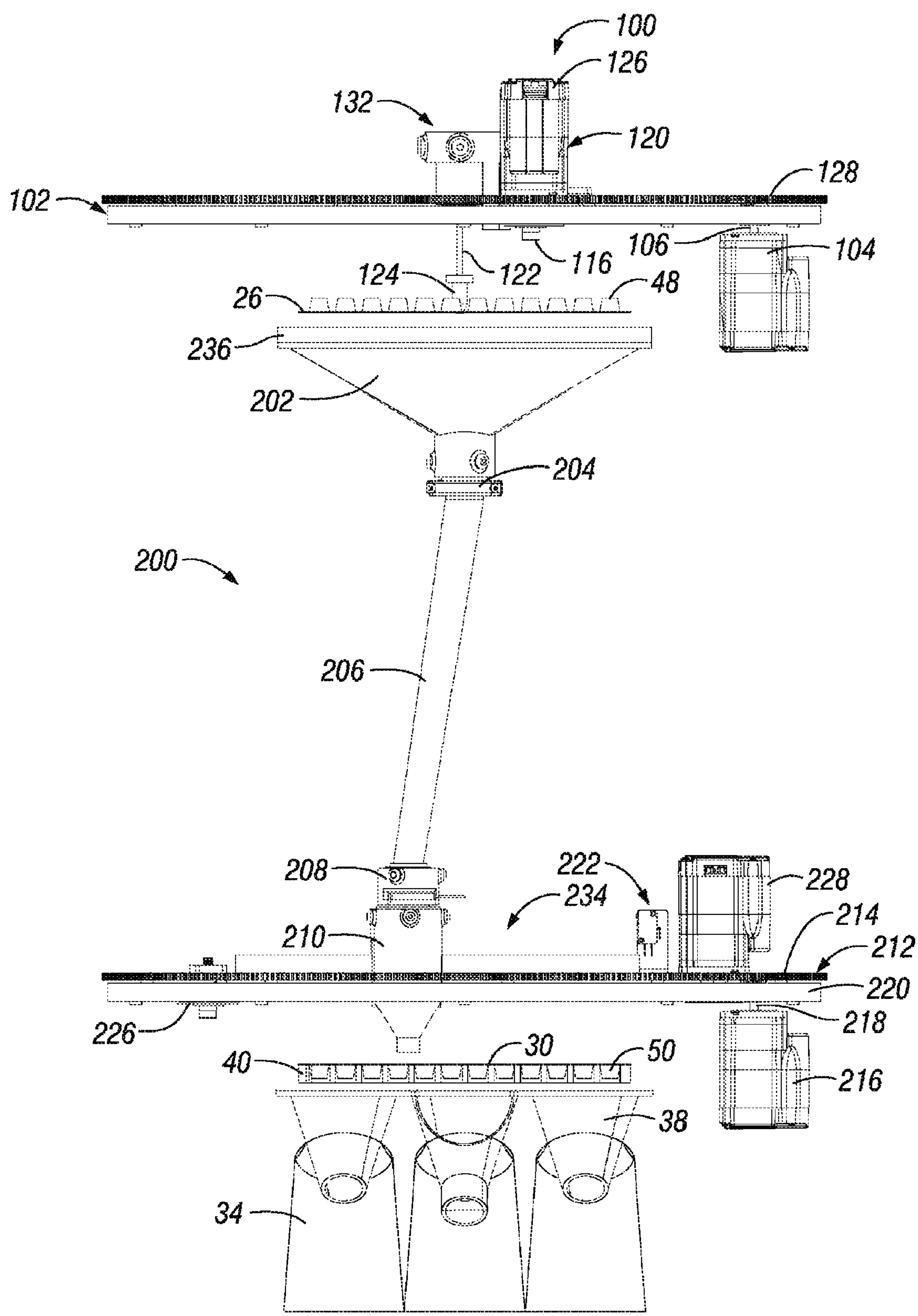
FIG. 3B is a front perspective view of the machine shown in FIG. 3A.
Figure 4A:
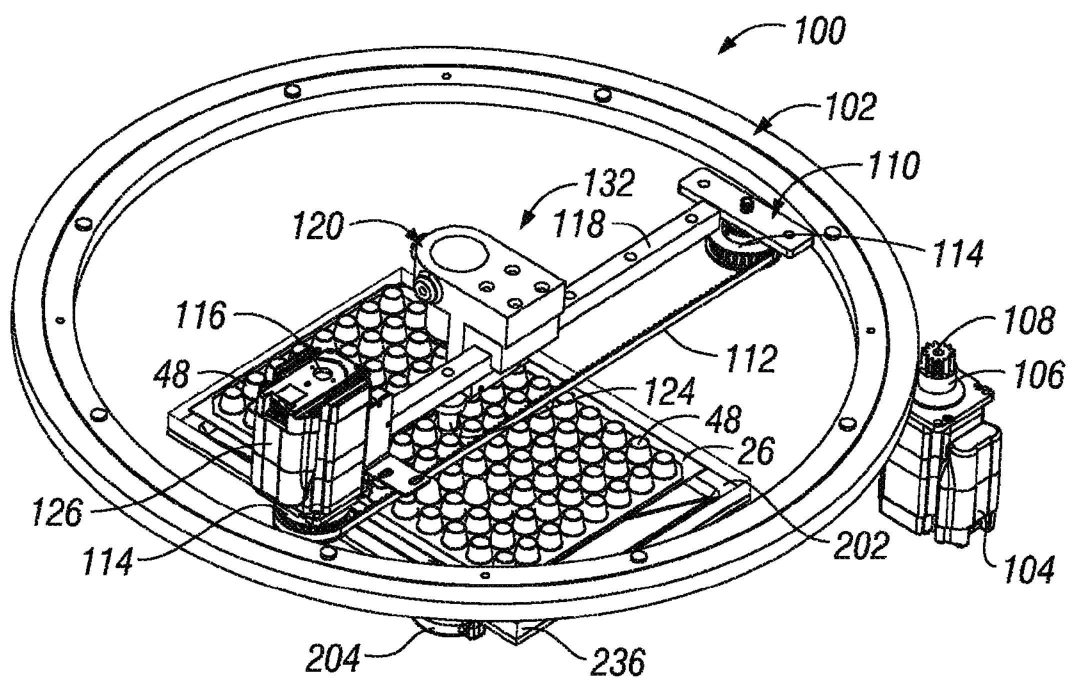
FIG. 4A is a perspective view of the dispensing system shown in FIG. 3A.
Figure 4B:
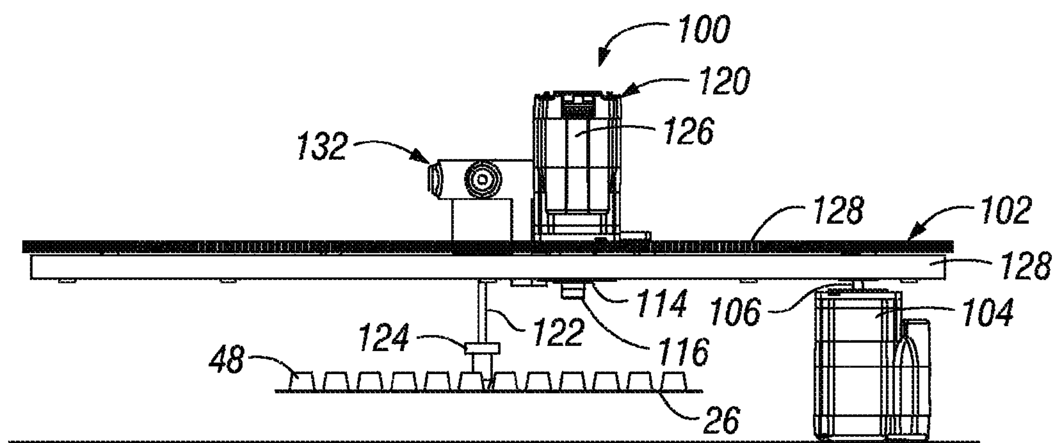
FIG. 4B is a side elevation view of the seed dispensing system shown in FIG. 4A.

FIGS. 3A and 3B show side and front perspective views of machine 10 with supporting hardware and cabinetry removed from the illustration to best show dispensing system 100 and delivery system 200. FIGS. 4A and 4B show a perspective and side elevation view of the dispensing system 100 shown in FIGS. 3A and 3B. In one aspect of the present invention, dispensing system 100 is configured to move a dispenser 120 to the stored location of selected seed within compartment layer 26 and dispense the selected seed from compartment layer 26 for subsequent handling by the delivery system 200. In another aspect, dispensing system 100 includes a multi-axis shuttle 132 for positioning dispenser 120 relative to one of wells 48 in compartment layer 26 having a selected seed. One axis of movement of the multi-axis shuttle 132 is provided by cogwheel 102. Cogwheel 102 is an annular ring which is rotatable using motor 104. Cogwheel 102 may include cogs 128 on its outer periphery or another surface as needed. Cogs 128 on cogwheel 102 mesh with gear 108 attached to shaft 106 powered by motor 104. Thus, rotation may be imparted to cogwheel 102 by operation of motor 104 to effectuate rotational movement of cogged belt pulley 110. Cogged belt pulley 110 is fixed and positioned relative to cogwheel 102 so that as motor 104 imparts rotation to cogwheel 102, cog belt pulley 110 rotates with cogwheel 102. Cog belt pulley 110 includes a pair of cogged pulley wheels 114 spaced apart by slider rail 118. The two cogged pulley wheels 114 are connected by cogged belt 112. One of the cogged pulley wheels 114 may be an idler wheel whereas the other cogged pulley wheel 114 may be a drive wheel connected to shaft 116 of motor 126. Slidably connected to slider rail 118 and fixedly connected to cogged belt 112 is dispenser 120. Rotation of cogged belt 112 using motor 116 causes dispenser 120 to translate back and forth on slider rail 118. The combination of movement of the cogwheel 102 and dispenser 120 provides dual axis movement of dispenser 120. Thus, by rotating cogwheel 102, which imparts rotation to cogged belt pulley 110, in combination with sliding dispenser 120 back and forth along slider rail 118, dispenser 120 can be positioned relative to any desired well 48 in compartment layer 26 for dispensing seed contained therein. The present invention contemplates other positioning means to position dispenser 120 relative to the compartment layer 26. For example, dispenser 120 could be shuttled along multiple axes using a conveyor, a carousel, a gantry, a mechanical armature, a conveyor in combination with a gantry, a multi-axis shuttle, or any like device. Dispenser 120 uses a plunger 122 having a tip 124 moveable up and down relative to dispenser 120 to engage a well 48 in compartment layer 26 to dispense seed therein. Plunger 122 may include an internal or external spring for biasing plunger 122 in a preferred direction. Those skilled in the art should appreciate that plunger 122 could be actuated or driven to engage wells 48 in compartment layer 26 for dispensing seed from compartment layer 26 using various driving means. For example, plunger 122 could be driven pneumatically, hydraulically or electrically. FIGS. 1 and 2 show in one aspect of the present invention a pressure regulator assembly 60 mounted to control box 20 for pneumatically controlling movement of plunger 122 relative to dispenser 120. Tip 124 attached to plunger 122 could be a plastic, rubber, metal, felt, elastomer, or other suitable material with sufficient suppleness and rigidity to compress well 48 without harming seed 52 being dispensed from well 48. Although dispenser 120 is shown with a single plunger 122, the present invention contemplates that dispenser 120 could include multiple plungers, in fact, the same number of plungers for each well 48 in compartment layer 26 whereby the plungers over the well(s) 48 with the desired seed would be activated to dispense the seed as would any other plungers in an efficient and high throughput manner for dispensing seed from compartment layer 26. In another aspect of the present invention, tip 124 could be formed to the shape of well 48 to facilitate dispensing of seed out of compartment layer 26.

The present disclosure is not limited to the aforementioned embodiments comprising dispenser 120. The present invention contemplates that dispenser 120 could be any device that provides a light mechanical force, a pneumatic force, a hydraulic force, a hydrostatic force, a linear force, a positive pressure, a negative pressure, a fluid shear pressure, a fluid laminar pressure, or a liquid jet pressure to dispense seed. Dispenser 120 could be configured to cut, pierce, puncture and/or apply uniform pressure across multiple wells 48 with a device such as a roller for dispensing seed from desired wells 48 in compartment layer 26. Similarly, in addition to driving plunger 122 with a solenoid motor, plunger 122 could be operated using an electro-mechanical actuator or an actuator driven by any of the aforementioned forces. Those skilled in the art can appreciate that tip 124 and the force/pressure at which tip 124 engages each well 48 to dispense seed from compartment layer 26 can be adjusted to protect the seed from harm while being dispensed and to ensure the seed is dispensed each time and not caught up in the compartment layer 26.

Figure 5A:
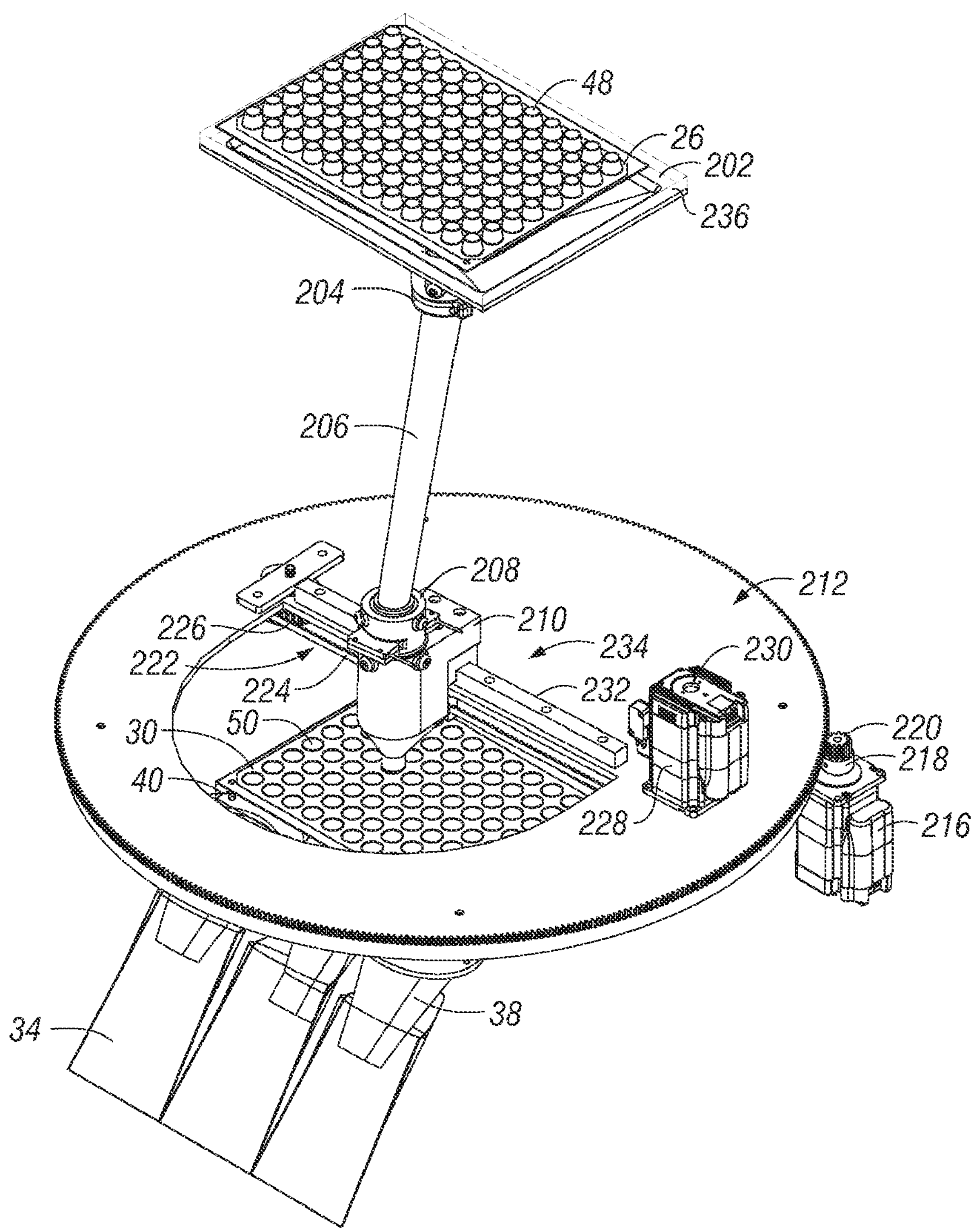
FIG. 5A is a perspective overview of the seed delivery system shown in FIG. 3A.
Figure 5B:
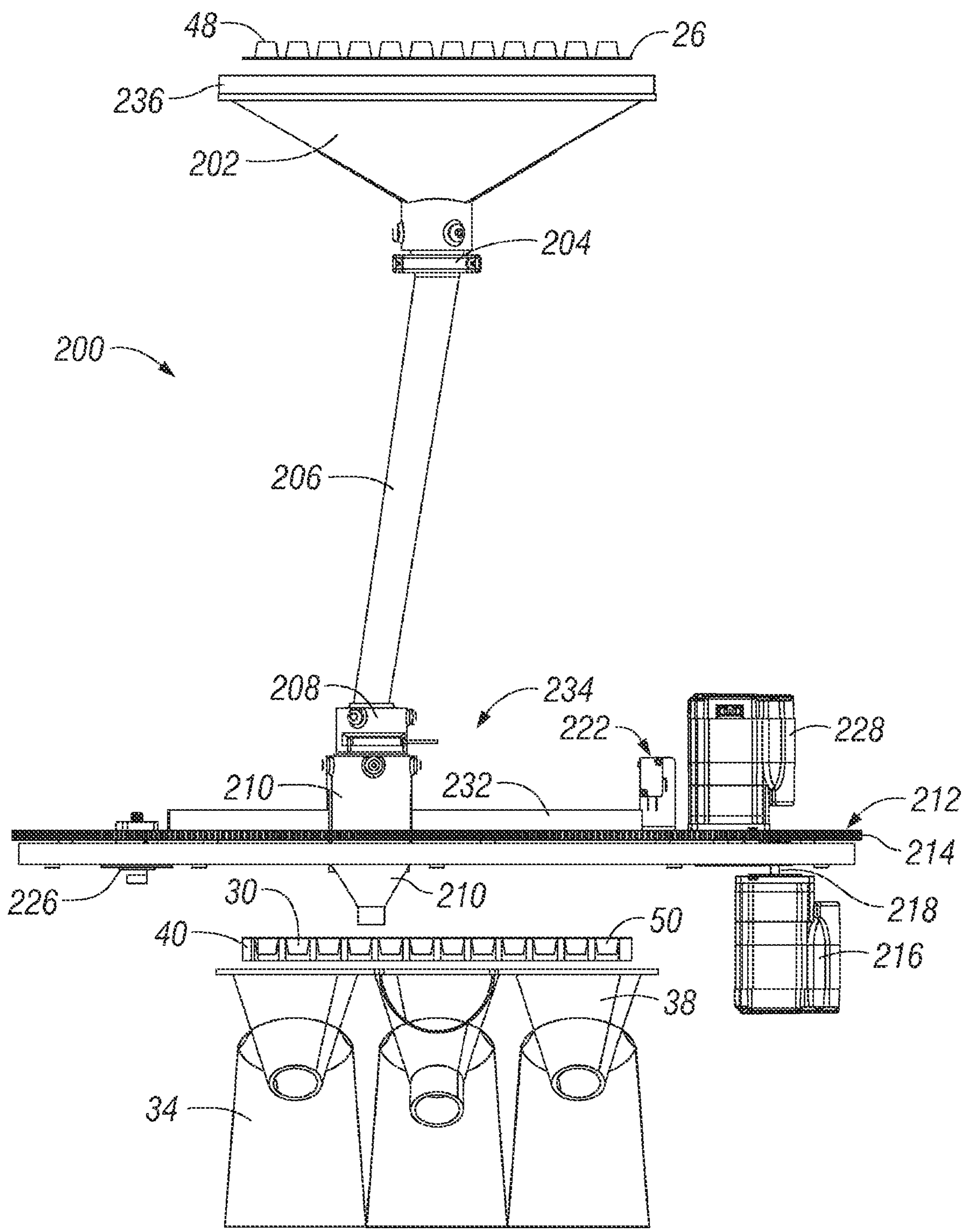
FIG. 5B is a side elevation overview of the seed delivery system shown in FIG. 5A.
Figure 6A:
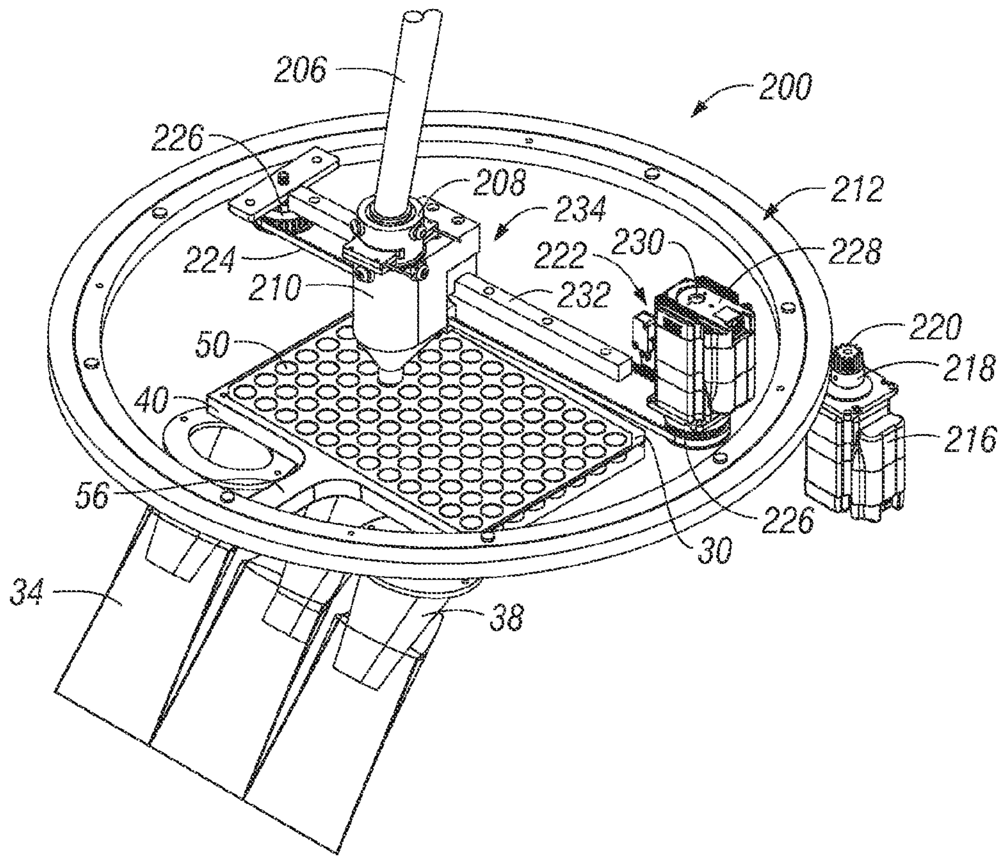
FIG. 6A is a perspective view of the lower half of the seed delivery system shown in FIG. 5A.
Figure 6B:
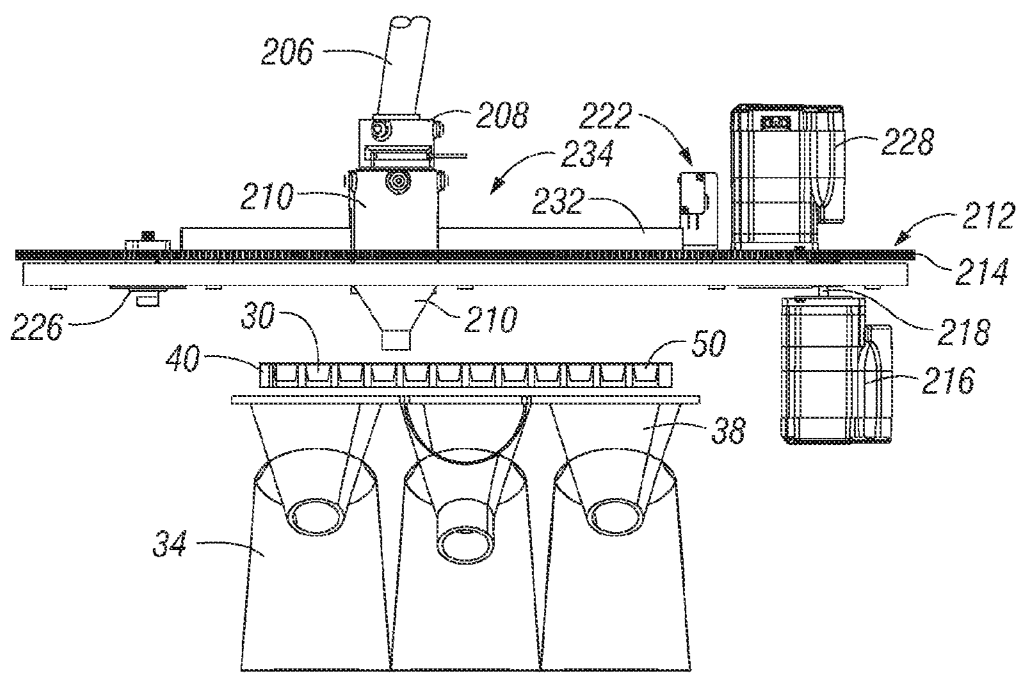
FIG. 6B is a front elevation view of the lower half of the seed delivery system shown in FIG. 6A.

FIGS. 5A-B and 6A-B provide perspective views and front elevation views respectively of delivery system 200 shown in FIGS. 3A and 3B. In one exemplary aspect of the present invention, the delivery system 200 provides structure for collecting seed dispensed from compartment layer 26 by the dispensing system 100 shown in FIGS. 4A and 4B and reconfiguring dispensed seed from compartment layer 26 into another container. The delivery system 200 of the present invention includes, as shown in FIGS. 5A and 5B, a collector 202 situated beneath compartment layer 26. The collector 202 captures dispensed seed from compartment layer 26. Collector 202 may include vertical retaining walls 236 to coral dispensed seed to prevent seed from escaping from delivery system 200. Vertical retaining walls 236 of collector 202 may be sufficiently tall so as to reduce the gap between compartment layer 26 and collector 202 to eliminate seed escaping the delivery system 200 by deflecting off and popping out of collector 202. Seed dispensed from compartment layer 26 are moved by gravity through collector 202 connected to tube 206 by union 204. Union 204 allows tube 206 to swivel multi-axially relative to collector 202. Tube 206 is connected to union 208 which is attached to nozzle 210. Like union 204, union 208 allows tube 206 to swivel multi-axially relative to nozzle 210. Union 204 and 208 provide the necessary degrees of freedom or multi-axial movement for nozzle 210 to move despite the fixed position of collector 202. Although collector 202 is at a fixed position relative to cabinet 12, those skilled in the art can appreciate that collector 202 could be configured to move relative to dispenser 120 or collector 202; moreover, dispenser 120 and collector 202 could move simultaneously and relative to each other to decrease the time required to shuttle one by shuttling both 202 and 120 at the same time. Seed dispensed from compartment layer 26 moves by gravity through tube 206 into nozzle 210. In one aspect, tube 206 is pliable or sufficiently flexible to allow nozzle 210 to rotate and move linearly relative to the position of collector 202 such that tube 206 is unlikely to kink or to become obstructed. The present invention contemplates including a sensor, whether optical or otherwise, to monitor the progression of seed through collector 202, union 204, tube 206, union 208, and nozzle 210 to detect when seed may get caught-up, lodged or trapped during reconfiguration from one container such as compartment layer 26 to other containers such as compartment layer 30 or envelope 34. One skilled in the art would appreciate the vast number of commercial and even special order materials available for tube 206 that have such attributes due to the flexibility of the material itself, or due to the design or manufacture of the article, such as the use of pleated, corrugated, or convoluted regions, or due to a combination of material and design. For example, tube 206 could be constructed from materials including but not limited to latex, rubbers, plastics such as PVC, or silicon any of which are optionally reinforced with fiber or wire to provide the necessary flexibility to move one end of the tube 206 relative to the other end. In some embodiments, tube 206 may be sufficiently transparent so that dispensing of items can be visually observed. Although tube 206 is shown connecting collector 202 with nozzle 210, the present invention contemplates other delivery means for communicating or delivering articles from collector 202 to nozzle 210. For example, the present invention contemplates other delivery means such as a conveyor, a conduit, a sleeve, a manifold, a carousel, a funnel, a tube, a path, a column, a chute, a tunnel or any other like delivery means.

Similar to the operation of dispenser 120 shown in FIGS. 4A and 4B, delivery system 200, best shown in FIGS. 5A-6B, includes a multi-axis shuttle 234 having a nozzle 210 that translates back and forth across slider rail 232 using cogged belt pulley 222. Cogged belt pulley 222 includes a pair of cogged pulley wheels 226 spaced apart by slider rail 232. The two cogged pulley wheels 226 are connected by cogged belt 224. One of the cogged pulley wheels 226 may be an idler wheel whereas the other cogged pulley wheel 226 may be a drive wheel connected to shaft 230 of motor 228. Slidably connected to slider rail 232 and fixedly connected to cogged belt 224 is nozzle 210. Rotation of the cogged belt 224 using motor 228 causes nozzle 210 to translate back and forth on slider rail 232. In addition to linear movement imparted to nozzle 210 by cogged belt pulley 222, cogwheel 212, as best illustrated in FIG. 5A, imparts rotational movement to nozzle 210. Like cogwheel 102 shown in FIG. 4A, cogwheel 212 includes cogs 214 that mesh with gear 220 attached to shaft 218 driven by motor 216. Thus, motor 216 imparts rotation to cogwheel 212 which cogged belt pulley 222 and nozzle 210 are attached thereto. The combined movement of cogwheel 212 and cogged belt pulley 222 allows nozzle 210 to be positioned on top of any desired well 50 within compartment layer 30 for reconfiguring seed therein. Alternatively, compartment layer 30 along with jig 40 may be removed from container holding hardware 32 so that nozzle 210 may be aligned with one of feeder tubes 38 for bulking seed from one or more compartment layers 26 into envelope 34. The present invention contemplates other positioning means to position nozzle 210 relative to the compartment layer 30. For example, nozzle 210 could be shuttled along multiple axes using a conveyor, a carousel, a gantry, a mechanical armature, a conveyor in combination with a gantry, a multi-axis shuttle, or any other like device.

The apparatuses of the present invention contemplate and appreciate the advantages of tracking and indexing location, trait(s), and other information specific to each seed or groups of seed reconfigured into another container, such as compartment layer 30 or envelope 34. For example, information specific to each seed or groups of seed could be catalogued, recorded, and/or stored electronically or otherwise for tracking and indexing seed or seed groups after being reconfigured into another container.

Method

Figure 7A:
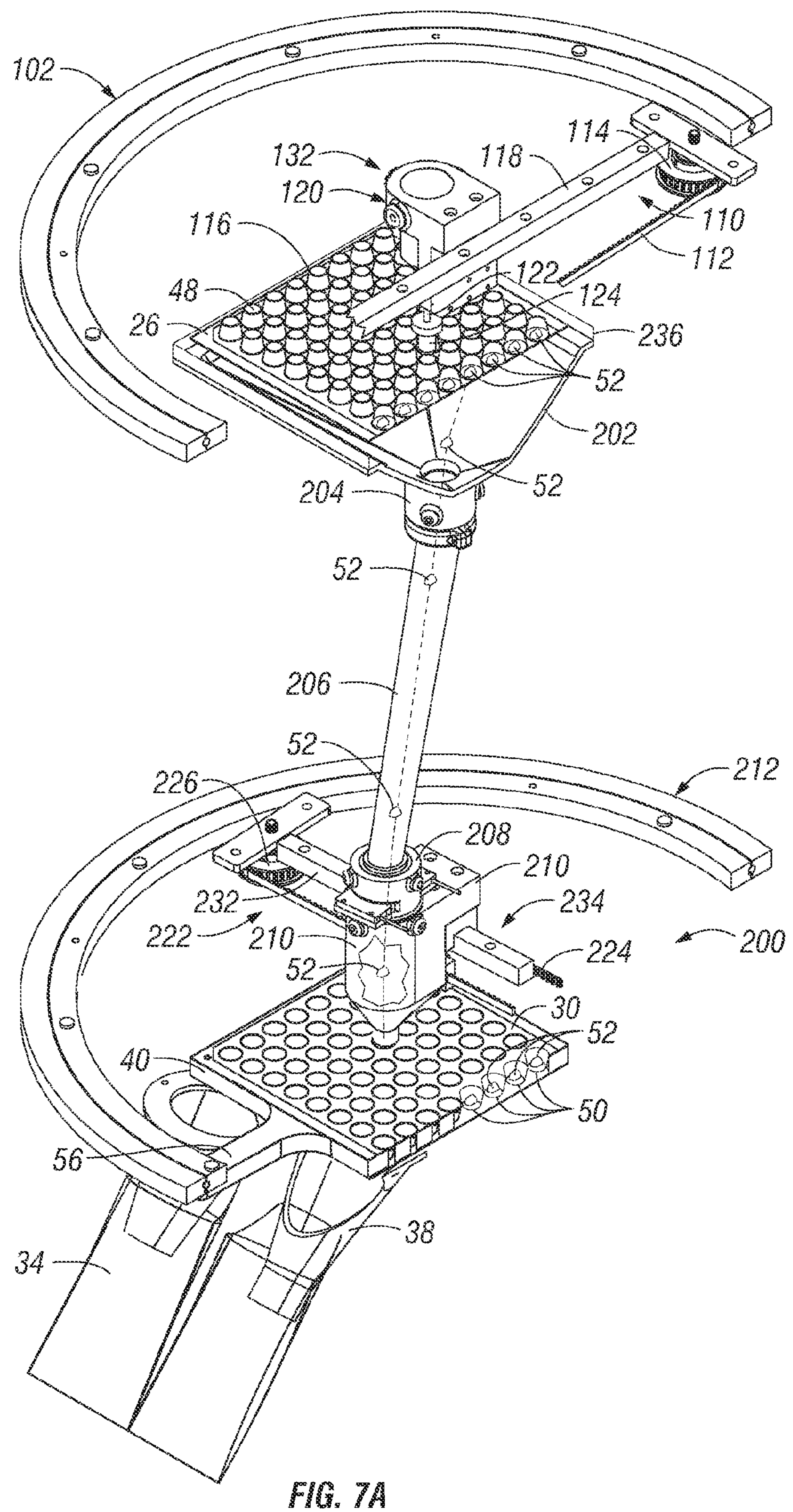
FIG. 7A is a section view taken along line 7A-7A in FIG. 3A showing resingulation of seed into a compartment layer.
Figure 7B:
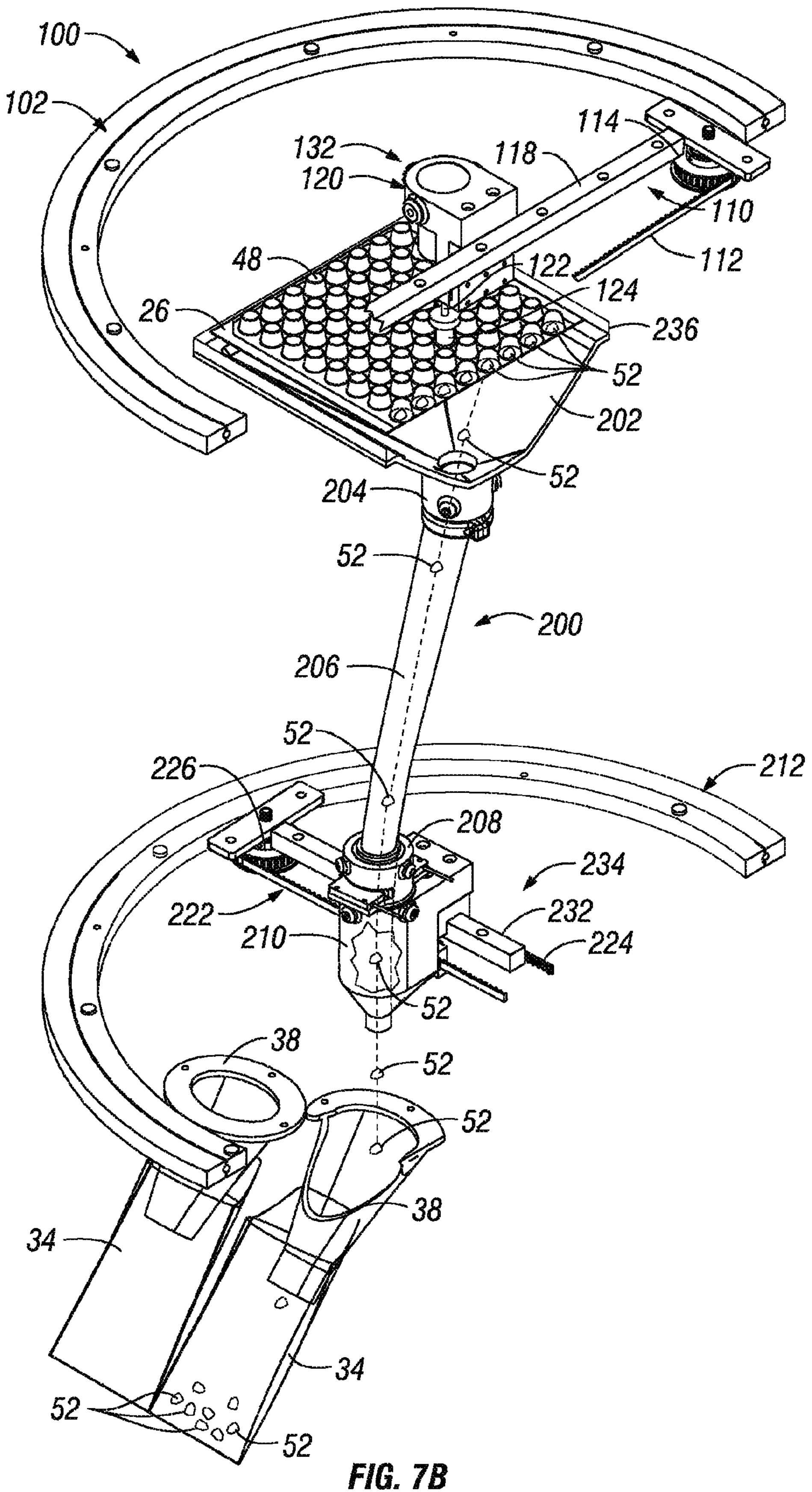
FIG. 7B is a section view taken along line 7B-7B in FIG. 3A showing bulking of seed into another container.

FIG. 7A illustrates one method of the present invention wherein some or all content, such as seed 52, in one or more compartment layers 26 is reconfigured into compartment layer 30. Similarly, FIG. 7B illustrates a method of the present invention wherein some or all content, such as seed 52, in one or more compartment layers 26 is reconfigured by bulking into another container. According to an exemplary aspect of the present invention, a container, such as compartment layer 26, is moved into cabinet 12. Those skilled in the art can appreciate that the containers of the present invention are not limited to compartment layer 26 illustrated in FIG. 5A. The present invention contemplates other containers, such as, but not limited to a bag, an envelope, a tray, including but not limited to a bubble tray, a reusable tray, a breeder tray, an assay tray, a clamshell container, seed tape, or any other like tray or container.

Containers such as compartment layers 26 and 40 and envelopes 34 could be moved into cabinet 12 and container holding hardware 28 or 32 by manual, semi-automatic or fully-automatic means, such as a conveyor, a carousel, a gantry, a mechanical armature, a conveyor in combination with a gantry, a multi-axis shuttle, a robotic device or any other like container handling and moving devices. These same devices could function as container holding hardware 28 or 32. Other hardware for holding containers could include one or more brackets, one or more clamps, a sleeve, a recess, a slot, a keyed parking place, or other like hardware.

Before or after compartment layer 26 is positioned within container holding hardware 28, specific information may be acquired regarding the content. For example, in the case of storing seed 52 in wells 48 of compartment layer 26, information acquired about each seed 52 from testing and stored in a data store, a manual data log, a computer-assisted data log, or an intelligent control may be recalled. Stored information about seed 52 in compartment layer 26 may be accessed by including an identifier on compartment layer 26. The identifier could include, but should not be limited to, a barcode, an RFID tag, a label, a sticker, an inscription, an optical character, or other scannable or readable labels. The identifier on the compartment layer 26 could be recognized by scanning, reading, or manually identifying. In addition, the identifier could be recognized using optical character recognition (OCR) or some order-based identification system. In one aspect of the present invention, a scanner 58 is positioned within cabinet 12 relative to container holding hardware 28 such that scans from the scanner read the surface of the compartment layer 26 having the identifier to read the identifier and access information about the compartment layer 26 and/or each seed 52 within compartment layer 26. Those skilled in the art can appreciate that a scanner or reader similar to scanner 58 could also be positioned relative to container holding hardware 32. The retrieved information corresponding to each seed 52 could be used to screen which seed 52 comply with a desired seed selection criterion. For example, the seed selection criterion could be based upon the desire to select seed 52 having at least one biological trait, at least one genetic trait, at least one phenotypic trait, some morphological trait, or any of the aforementioned traits to facilitate field planting layouts, a desired pollination between plants grown from seed 52, or some desired pedigree. Using the aforementioned selection criterion and information known about each of the seed 52, seed 52 meeting the requirements of the selection criterion can be dispensed from compartment layer 26 and reconfigured into another container, such as compartment layer 30 or envelope 34. Thus, for example, if it is desirable to fill compartment layer 30 or envelope 34 with all seed 52 having trait X, containers having seed 52 with trait X could be identified by accessing a data store having known information about the seed 52, including information regarding trait X recallable by recognition of identifier on compartment layer 26. The selected seed 52 could then be dispensed from its location in container 26 to be reconfigured into well 50 in compartment layer 30 or into envelope 34 having only seed 52 with trait X. Thus, reconfiguration of seed 52 from compartment layer 26 is accomplished as motors 104 and 126, which may be servo motors controlled by a computer 54 (shown in FIG. 8), an intelligent control, a programmed logic controller (PLC), a semi-manual control or fully-manual control, move dispenser 120 overtop the well 48 having the selected seed 52 or seed 52 meeting the desired selection criterion. Using any one of the aforementioned controls, the dispenser 120 may be activated so plunger 122 thrusts tip 124 downward onto well 48 such that seed 52 is forced out of well 48 to dispense selected seed 52 from the compartment layer 26 for reconfiguring into compartment layer 30 or bulking into envelope 34. Before or while seed 52 is being dispensed from compartment layer 26, nozzle 210 may be positioned atop a specific well 50 within compartment layer 30, envelope 34 or some other container. The present invention further contemplates more than one envelope being filled at one time, such that if the selection criteria is for trait X, Y, & Z, trait "X" seeds are specifically selected and dispensed into envelope X, trait "Y" seeds into envelope Y, and trait "Z" seeds into envelope Z. Seed 52 descends by gravity after being dispensed from the compartment layer 26 and is collected by collector 202. It should be appreciated that seed descent could be accomplished other than by gravity. For example, seed descent and even loading into another container from nozzle 210 could be accomplished using pneumatics, such as air currents or back pressure introduced into collector 202. Seed 52 continues its descent through collector 202 into tube 206, through nozzle 210, and into the desired storage point, whether well 50 within compartment layer 30, envelope 34 or some other container. The dispensing system 100, nozzle 210 of delivery system 200 is positioned relative to the desired well 50 within compartment layer 30 or envelope 34 by way of cogged belt pulley 222 and cogwheel 212. Operating motors 228 and 216 allow the nozzle to be turned radially and traversed laterally to be positioned at a desired point above compartment layer 30 or envelope 34. Although the present invention discloses the dispenser 120 and nozzle 210 being moved relative to containers 26, 30, and 34, it should be appreciated that the present system may be configured to move containers 26, 30, or 34 relative to dispenser 120 and nozzle 210. According to one embodiment of the method of the present invention, the machine, or by operation of an intelligent control, such as computer 54, may select seed 52 having a desirable advantageous trait from one or more compartment layers 26 and reconfigure the selected seed 52 within compartment layer 30 for subsequent experiments, planting or the like. Other benefits may be derived from reconfiguring seed. For example, ridding of unwanted seed to reduce storage needs, cost, etc. may be accomplished. Seed may also be stored as a pool, other seed as single seed, or even just separate seed into different containers on the basis of a certain selection criteria. Seed may also be reconfigured into different containers for subsequent assays. The methods of the present invention may also be used to identify seed 52 having trait X, Y, and Z, dispensing seed 52 having trait X, Y, and Z from one or more compartment layers 26 into a desired configuration into compartment layer 30 to facilitate subsequent experiments, storage, planting, pollination, and the like. The present invention also contemplates methods including applying an identifier to compartment layer 30 or envelope 34 to index the end location of seeds reconfigured from compartment layer 26 into compartment layer 30 and to track the origination of seeds reconfigured in compartment layer 30 or envelope 34. Further embodiments of the present invention include, providing seed treatment hardware operating in cooperation with the dispensing system 100 and/or the delivery system 200 to treat the seed reconfigured in well 50 within compartment layer 30 or in envelope 34. Those skilled in the art can appreciate that the treatment process, such as treating with an antifungal, could occur during the dispensing or reconfiguring process. For example, treatment could be added to the destination well 50 after the seed has been dispensed and collected therein, but before resealing compartment layer 30. In another aspect, dispensed seed passing through tube 206 could be treated by being passed through a spray path of treatment liquid in cooperating relation with tube 206 such that the seed is received in the destination well 50 or envelope 34 having been treated.

The methods of the present invention contemplate and appreciate the advantages of tracking and indexing location, trait(s), and other information specific to each seed or groups of seed reconfigured into another container, such as compartment layer 30 or envelope 34. For example, information specific to each seed or groups of seed could be catalogued, recorded, and/or stored electronically or otherwise for tracking and indexing seed or seed groups before and after being reconfigured into another container.

System

Figure 8:
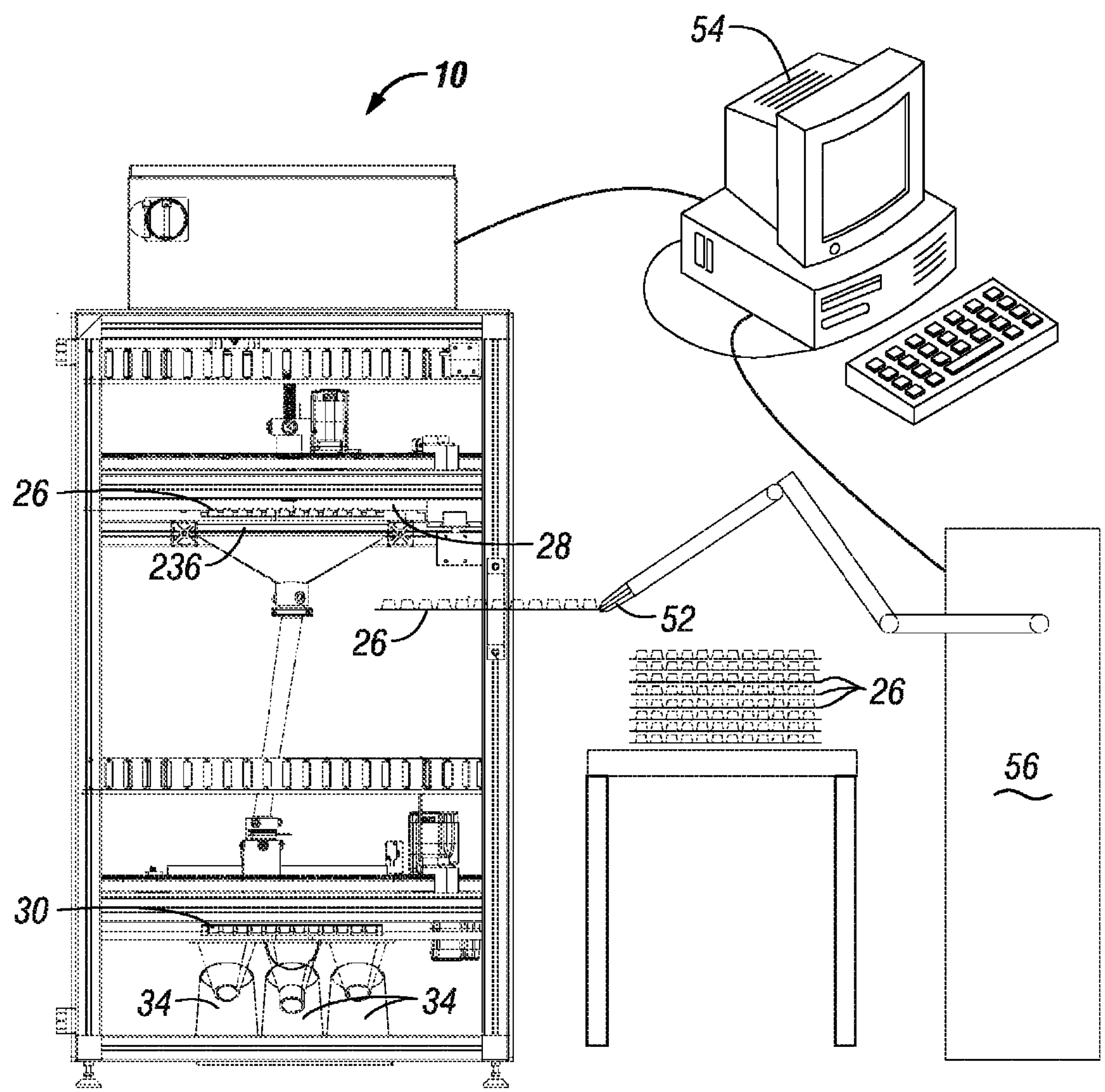
FIG. 8 is an overview of an exemplary system of the present invention.

FIG. 8 is an illustration of an exemplary system of the present invention. The system of the present invention contemplates semi- and fully-automatic operation in addition to manual operation of machine 10. For example, machine 10 could be controlled and operated by computer 54 or any like intelligent control, programmable logic controller (PLC), semi-manual control, or a fully-manual control. Computer 54 could have a data store for storing information about seed 52 in compartment layer 26. Specific information about seed 52, including but not limited to information based on seed 52 pedigree, previous experimental treatments of the seed 52 or the parent plant, information from non-destructive testing of the seed 52 or the parent plant, information acquired by testing a portion of seed 52 or the parent plant, pollination information for the parent plant and previous generations, transformation information such as transgene(s) of interest, event information and the like, or any combination of information, could be accessed from the data store by reading an identifier associated with or physically located on compartment layer 26. The identifier associated with each compartment layer 26 could be read manually or by using scanner 58 associated with machine 10 or some device external to machine 10, such as a scanner, a reader, an optical character recognition (OCR) system, an order-based system, or any like device adapted to read an identifier associated with each compartment layer 26. In another aspect of the present invention, compartment layer 26 identified as having seed 52 meeting the selection criterion could be identified using computer 54, hand or robotically selected from multiple compartment layers 26, and loaded by hand or automation into machine 10 to dispense and reconfigure selected seed 52 from compartment layer 26 into another container, such as compartment layer 30 or envelope 34, as desired. In another exemplary aspect of the present invention, a container handling device 56, such as a conveyor, a carousel, a gantry, a mechanical armature, a conveyor in combination with the gantry, a multi-axis shuttle, an order-based system, an automated stacker-based system or any like container handling device could be used to automate handling of containers, such as compartment layer 26, and/or 30, whether inserting containers into or removing them from machine 10. The present invention contemplates multiple container handling devices for identification of the compartment layer 26 and its specific content, which could be obtained before or after compartment layer 26 is inserted into the machine 10. For example, if the selection criterion is looking for seed 52 with trait X, a barcode, an RFID tag, a label, a sticker, an inscription, an optical character or some other scannable or readable label or identifier on compartment layer 26 could be used to access stored information about seed 52 to identify whether or not any of the seed 52 in the compartment layer 26 have trait X; if so, compartment layer 26 having seed 52 with trait X could be manually, semi-automatically or by a fully-automated process be inserted into container holding hardware 28 within machine 10. Once compartment layer 26 is inserted into machine 10, compartment layer 26 could be shuttled about using a conveyor, a carousel, a gantry, a mechanical armature, a conveyor in combination with a gantry, a multi-axis shuttle, or some other like automated or robotic device. Compartment layer 30 and/or envelope 34 could be shuttled to-and-fro within machine 10 and moved in and out of the machine 10 using like container handling means. Once seed 52 are reconfigured in compartment layer 30 or envelope 34, some identification means such as a barcode, an RFID tag, a label, a sticker, an inscription, optical characters, or other scannable readable labels may be added to compartment layer 30 to index the origination and reconfiguration of seed 52 contained in the compartment layer 30, envelope 34 or other like container. Thus, by reading the identifier on the compartment layer 30 or envelope 34 one may at some later point in time, after recovering the compartment layer 30 or envelope 34 from storage, identify the seed, origination of the seed, knowledge about seed traits, parentage, advantageous properties, or the like. The system of the present invention could also include a container closure system, within or without machine 10, adapted to close and seal reconfigured seed 52 inside compartment layer 30, envelope 34, or any like sealable container.

The systems of the present invention contemplate and appreciate the advantages of tracking and indexing location, trait(s), and other information specific to each seed or groups of seed reconfigured into another container, such as compartment layer 30 or envelope 34. For example, information specific to each seed or groups of seed could be catalogued, recorded, and/or stored electronically or otherwise for tracking and indexing seed or seed groups after being reconfigured into another container.

Referring further to FIG. 8 and the various embodiments, machine 10 may be a manually or automatically operated system that includes at least one computer 54, such as a programmable logic controller (PLC) suitable to execute all functions, such as dispensing, delivering, or identifying seed, associated with machine 10 to manually, automatically, or robotically control operation of machine 10 as described herein. Those skilled in the art can appreciate that the PLC may include any computer based system such as those including an electronic storage device with one or more readable mediums such as one or more remote or local electronic data storing devices to store, operate and execute relevant software programs, including spreadsheets, databases, archives, algorithms, and any other storable information. Those skilled in the art can further appreciate that the PLC may be configured to access, read, and execute information and data stored in a portable electronic storage device, such as a thumb drive, zip disc, compact disc, or other external or peripheral memory devices. The present invention contemplates that machine 10 may be controlled locally or remotely. For example, computer 54 could be connected to a computer network to upload and download information from the network regarding operation of machine 10. For example, the present invention contemplates that machine 10 may be accessed by a computer network to allow operation of machine 10 using operating software 62 (shown in FIGS. 10A-10B) to program, execute and operate machine 10. In one embodiment of the present invention, users may log onto machine 10 remotely by connection using a computer network to access databases and other information regarding seed type in each compartment layer 30, location of compartment layer 30 with seed type having the desired trait, and operational information, algorithms or any other like information needed to process each job.

Figure 9A:
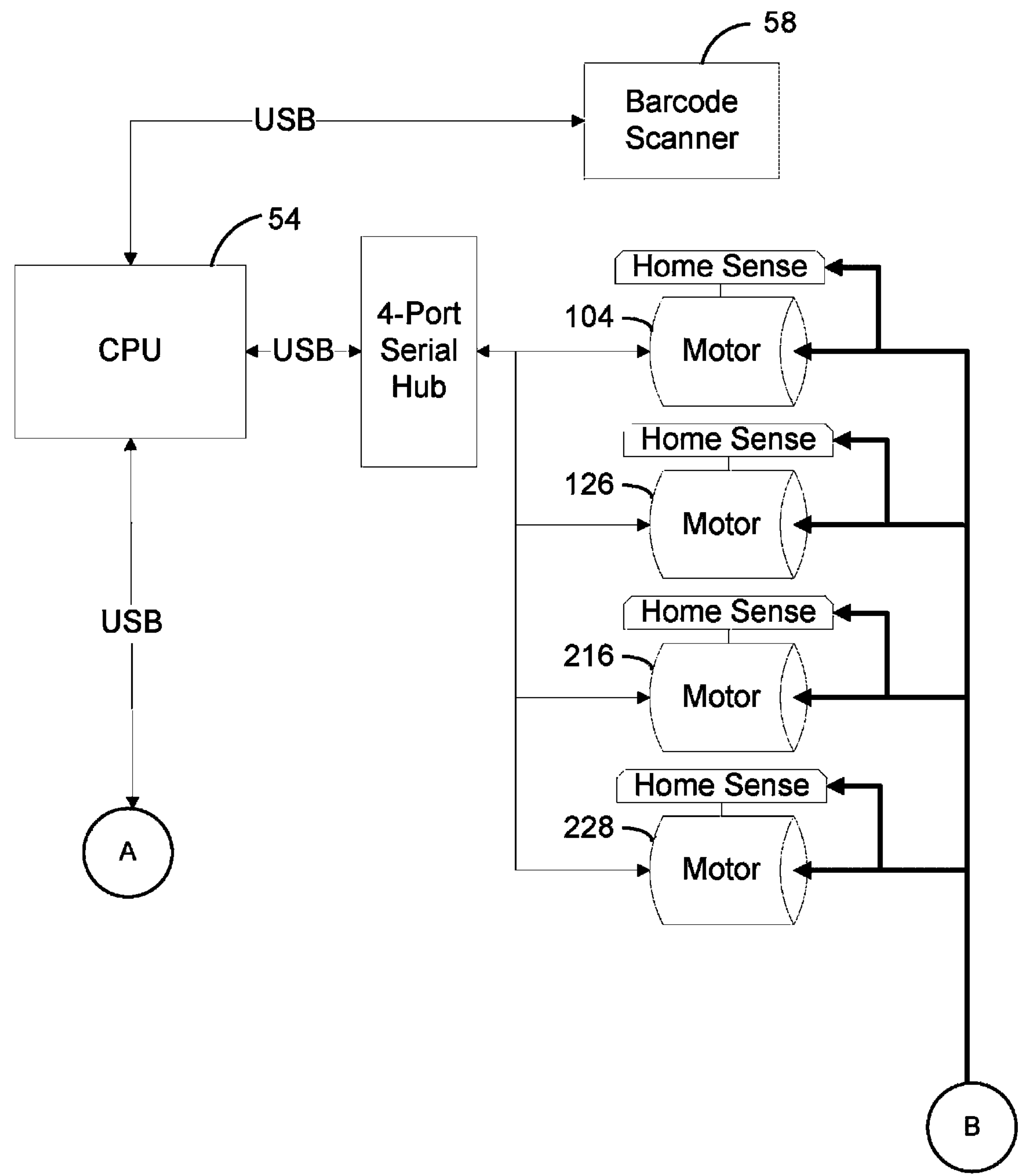
FIG. 9A illustrates a section of a flowchart for the electrical operating system according to an exemplary aspect of the present invention.
Figure 9B:
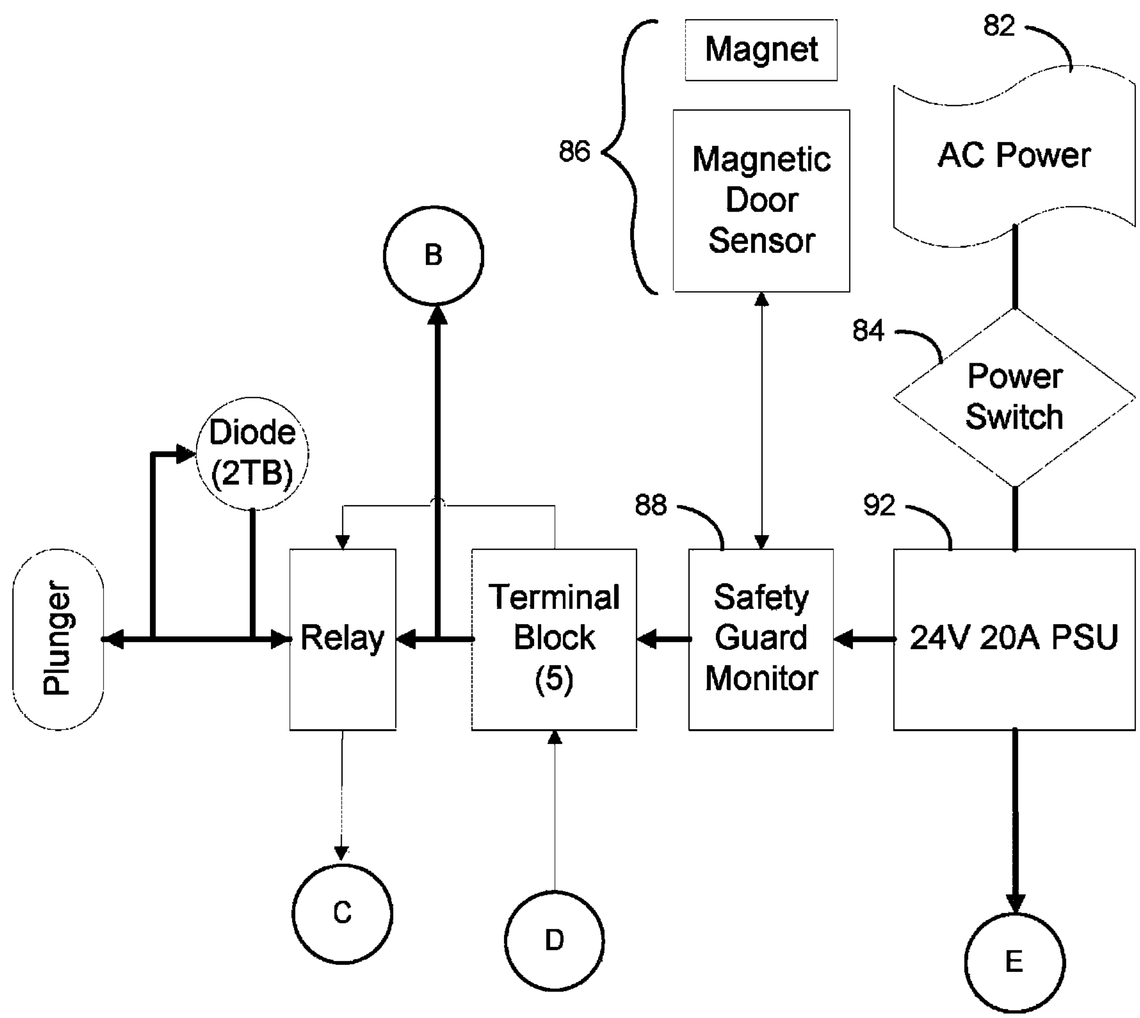
FIG. 9B illustrates another section of the flowchart for the electrical operating system shown in FIG. 9A.
Figure 9C:
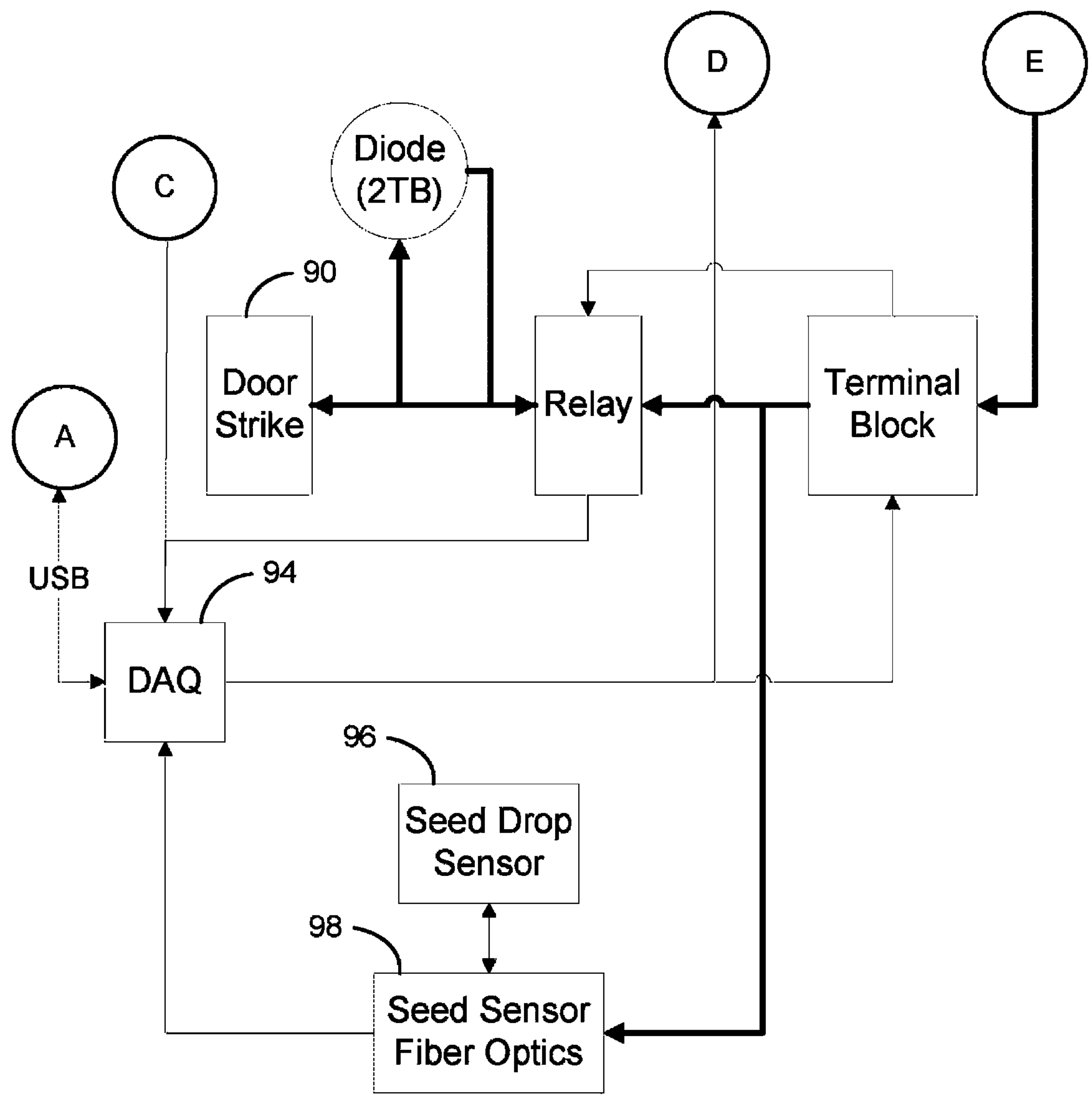
FIG. 9C illustrates another section of the flowchart for the electrical operating system shown in FIGS. 9A and 9B.
Figure 10A:
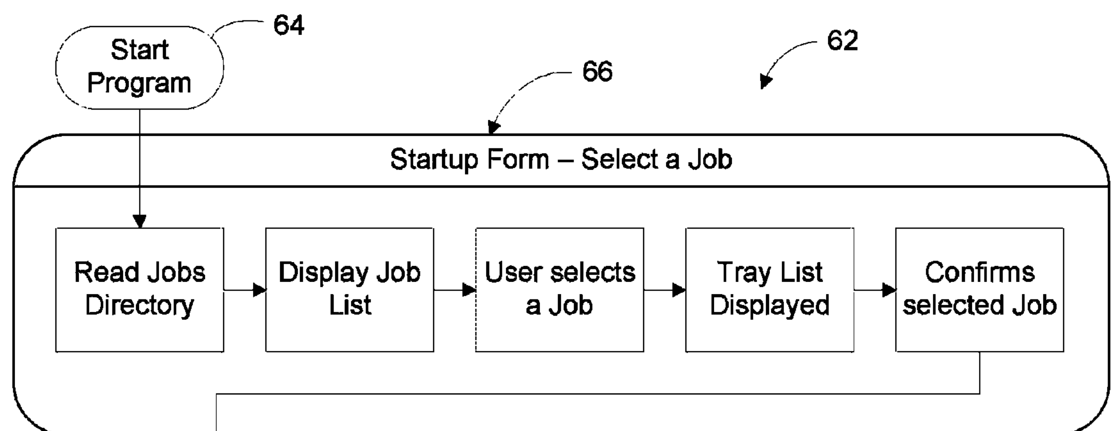
FIG. 10A illustrates a section of a flowchart for the software operating system according to an exemplary aspect of the present invention.

According to another aspect of the present invention, machine 10 may be controlled by operating software 62, stored on a storage device such as computer 54, and executed by computer 54 using operating controls such as inputs associated therewith, sensors, and other manual or automated components of machine 10, which are shown and may be controlled by the electrical operating schematic 80 shown in FIGS. 9A-9C. According to one exemplary embodiment, operating software 62 may be activated or started manually or even automatically by moving a desired compartment layer 26 into container holding hardware 28 within machine 10. Those skilled in the art can appreciate that operating software 62 may be opened and program started as shown at 64 through use of a wired or wireless network or simply powering up computer 54 or machine 10 by way of power switch 84 connected to AC power 82 to supply power to power supply unit 92 (shown in FIG. 9B). With operating software 62 having been opened and now running, a start up form for selecting a job as shown at 66 in FIG. 10A is presented providing information ranging from existing jobs or jobs currently listed in the jobs directory, as well as newly created jobs by displaying a job list from which one or more jobs may be selected and/or a tray list displayed for each of the selected jobs from which one or more of the trays (such as compartment layer 26) may be confirmed or selected to be part of the specific job. For example, each compartment layer 26 or 30 and envelope 34 carry with it corresponding identifying information, accessible in exemplary embodiments by scanning a barcode to apprise of seed characteristics of seed contained in each and/or traits such as color, composition, weight, genetic trait, quality, size, shape, or other biological or morphological trait that may be helpful in distinguishing one seed from another or one compartment layer or envelope from another to ultimately identify/know what seed is contained within each well 48 or 50 within compartment layer 28 or 30. Depending upon the specific job selected, any one of the available compartment layers 26 or trays may be selected for dispensing seed therefrom, and compartment layer 30 or envelope 34 may be selected for collecting dispensed seed according to the operating parameters of operating software 62. Once the desired jobs have been selected, a process job form 68 (shown in FIG. 10B) is provided on a display associated with computer 54. Process job form 68 includes displaying the current status of machine 10, including the trays or compartment layers that have been confirmed and are a part of the to-do tray list, updated information on any completed tray or compartment layer list, status indicators of compartment layers, completed tasks or jobs, scheduled tasks or jobs, or any other like or relevant status indicators. Additional displays may include dispensed or undispensed wells 48 in each compartment layer 26 as well as a display for occupied and unoccupied wells 50 in compartment layer 30. With the door lock disengaged and the door opened and motors powered off for safety reasons, the desired compartment layer 26 or tray indicated in the tray list displayed may be selected manually or automatically such as robotically and inserted into container holding hardware 28 within machine 10. Those skilled in the art can appreciate the various means for monitoring and operating machine 10 safely. For example, a safety guard monitor 88 may monitor a magnetic door sensor 86 (shown in FIG. 9B) on door 14 of machine 10 to insure the power is off until door 14 is confirmed closed and door strike 90 being actuated. As illustrated in FIGS. 9A-9C, sensor information, such as from safety guard monitor 88 or power supply unit 92 can be relayed to a data acquisition device (DAQ) 94 associated with computer 54.

Figure 10B:
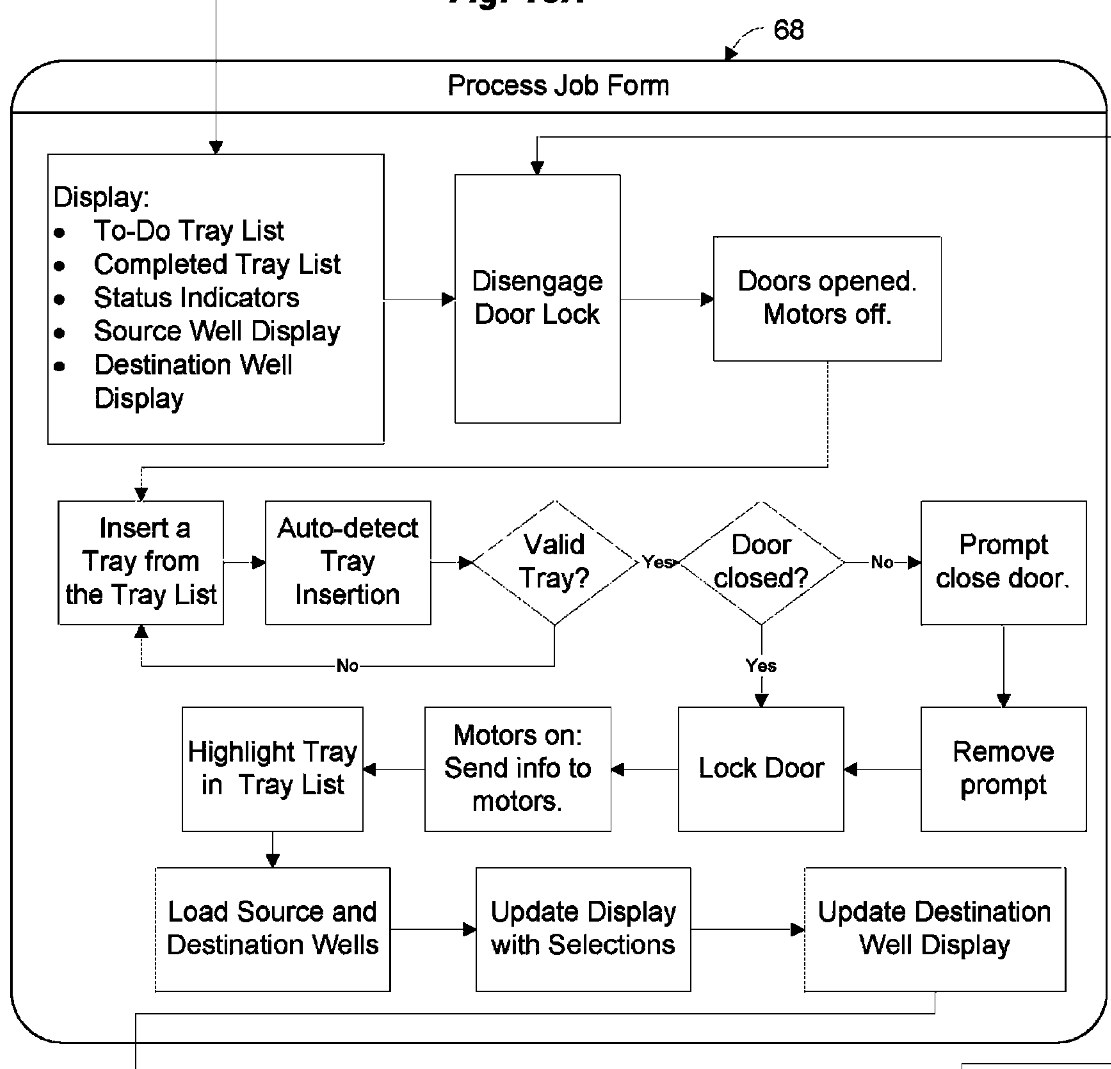
FIG. 10B illustrates another section of the flowchart for the software operating system shown in FIG. 10A.
Figure 10C:
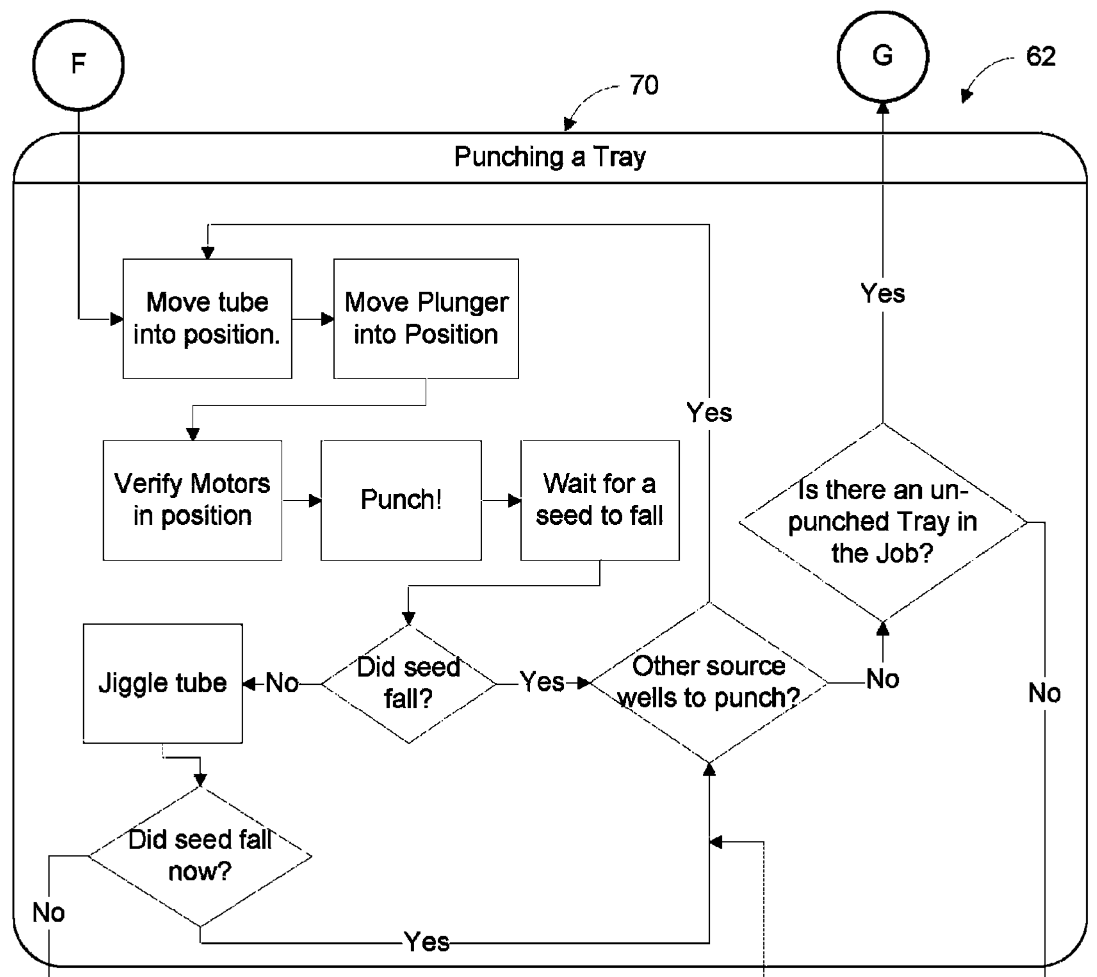
FIG. 10C illustrates another section of the flowchart for the software operating system shown in FIG. 10B.
Figure 10D:
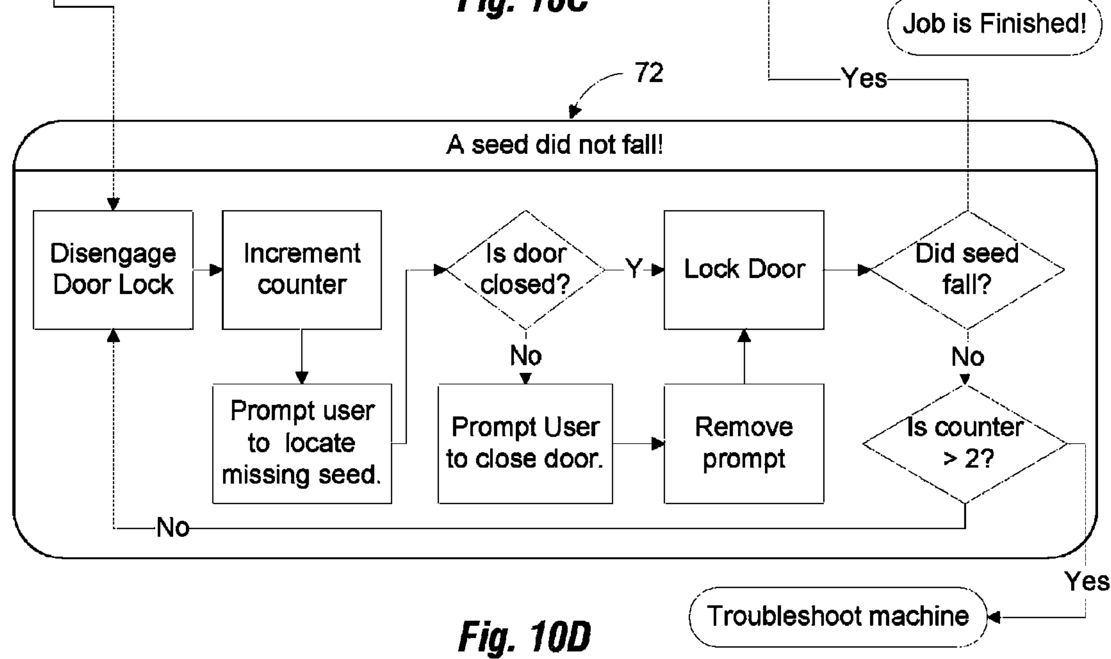
FIG. 10D illustrates another section of the flowchart for the software operating system shown in FIG. 10C.

As illustrated in both FIG. 9A and FIG. 10B, scanner 58 may be used to auto detect when compartment layer 26 is properly inserted, positioned or loaded within container holding hardware 28 by communicating information from barcode scanner 58 to computer 54. For example, by reading an identifier, such as a barcode located on compartment layer 26, to confirm that compartment layer 26 and 30 or envelope 34 has been properly loaded within container holding hardware 28 and 32 or envelope holder 36 in machine 10. With compartment layer 26 and 30 or envelope 34 properly loaded within machine 10, the power to motors 104 and 126 associated with dispensing system 100 and motors 216 and 228 associated with delivery system 200 shown in FIG. 9A may be turned on upon closure of door 14. The desired wells 48 to dispense from compartment layer 26 may be selected and the desired wells 50 in compartment layer 30 or desired envelope 34 to receive dispensed seed may be selected. With the seed to be dispensed and the compartment layer 30 or envelope 34 selected to receive dispensed seed, the operating software 62 is ready to punch a tray as shown at 70 (FIG. 1C). To dispense seed from compartment layer 26, plunger 122 is moved into correct position using motors 104 and 126 and nozzle 210 is moved into the correct position using motors 216 and 228. Operating software 62 confirms the correct position of motors 104 and 126 of dispensing system 100 and motors 216 and 228 of delivery system 200. With confirmation of correct position of dispensing system 100 and delivering system 200, operating software 62 actuates dispenser 120 to cause plunger 122 to descend upon the desired well 48 within compartment layer 26 to dispense the seed therefrom. If there are multiple wells 48 to punch seed from, the dispensing system 100 and delivery system 200 are realigned accordingly by operating software 62 to dispense the desired seed and receive the dispensed seed in the desired well 50 within compartment layer 30 or envelope 34. If the seed did not fall as shown at 72, several steps may be taken to troubleshoot machine 10. For example, in the instance where a seed is not dispensed but the dispenser 120 has been actuated, or seed is dispensed and not accounted for within the destination well 50 within compartment layer 30 or within envelope 34, operating software 62 displays troubleshooting operations at 70 and 72. As previously taught, tube 206 may include a detector such as a light beam detector or seed sensing fiber optics 98 in communication with a seed drop sensor as shown in FIG. 9C. The sensor is tripped when a seed is not reported as having tripped the sensor to indicate when seed has been properly dispensed and moved from dispensing system 100 through delivery system 200 and into the destination well 50 within compartment layer 30 or within envelope 34. In the case where there is not a positive identification of seed being dispensed and transported from dispensing system 100 through tube 206 and into one or more of the compartment layers 30 or envelopes 34, the data acquisition device 94 communicates with computer 54 and the malfunction is displayed. The door of machine 10 may be disengaged and opened and to allow troubleshooting to identify the location of the unaccounted for seed. Once the unaccounted for seed has been found and placed in the proper position, an increment counter which counts each seed dispensing event, as discussed at 72 may be properly adjusted to allow operating software 62 to account for the seed.

Exemplary embodiments of the present invention have been set forth in the drawings and specification and although specific terms are employed, these are used in the generically descriptive sense only and are not used for the purposes of limitation. Changes in the formed proportion of parts, as well as in the substitution of equivalents are contemplated as circumstances may suggest or are rendered expedient without departing from the spirit and the scope of the invention, as further defined in the following claims.

Any references in the specification are herein incorporated by reference in their entirety.

What is claimed is:

1. A machine for automated movement of some or all content from a first container into a second container, comprising:
- a container holding system for securing said first and second containers;
- a dispensing system having a dispenser adapted to rupture content confined within said first container; and
- a delivery system comprising a positionable guideway having an inlet and outlet in communication with each other, the inlet positioned proximate the first container and the outlet shuttleable relative to a desired depositing location in said second container for reconfiguring content from said first container into said second container.

2. The machine of claim 1 further comprising an identification system for recognizing an identifier on said first and second containers, the identifier comprising a manual or machine readable identifier.

3. The machine of claim 2 further comprising an indexing system adapted to use said identifier to track and update stored locations in a manual or electronic data store for content moved from said first container to said second container.

4. The machine of claim 1 wherein said dispenser comprises a device adapted to separate content from said first container by application of mechanical force applied to said first container for rupturing content from confinement within said first container.

5. The machine of claim 1 wherein said content comprises:
- a. a corn seed;
- b. a canola seed;
- c. a soybean seed; or
- d. a rice seed.

6. The machine of claim 5 wherein reconfiguration of seed from one or more of said first containers to said second container is based upon a selection criterion, wherein said selection criterion considers one or more of the following:
- a. at least one biological trait;
- b. at least one genetic trait;
- c. at least one phenotypic trait;
- d. morphological traits;
- e. field layout; or
- f. pedigree.

7. The machine of claim 1 further comprising:
- a. a first multi-axis shuttle to position said dispenser relative to said first container; and
- b. a second multi-axis shuttle to position a nozzle at said outlet of said delivery system relative to said second container.

8. The automated machine of claim 7 wherein the first and second multi-axis shuttle further comprise one or more servo motors to rotate and translate said dispenser relative to said first container and said outlet of said positionable guideway relative to said second container.

9. The automated machine of claim 1 wherein said dispenser further comprises a plunger adapted to dispense seed from said first container, said plunger operated by an electromechanical actuator in communication with a controller.

* * * * *